(12) United States Patent
Uejima

(10) Patent No.: US 12,057,865 B2
(45) Date of Patent: Aug. 6, 2024

(54) RADIO-FREQUENCY MODULE AND COMMUNICATION DEVICE

(71) Applicant: Murata Manufacturing Co., Ltd., Kyoto (JP)

(72) Inventor: Takanori Uejima, Kyoto (JP)

(73) Assignee: MURATA MANUFACTINRG CO., LTD., Kyoto (JP)

( * ) Notice: Subject to any disclaimer, the term of this patent is extended or adjusted under 35 U.S.C. 154(b) by 368 days.

(21) Appl. No.: 17/652,757

(22) Filed: Feb. 28, 2022

(65) Prior Publication Data

US 2022/0182080 A1    Jun. 9, 2022

Related U.S. Application Data

(63) Continuation of application No. PCT/JP2020/022468, filed on Jun. 8, 2020.

(30) Foreign Application Priority Data

Aug. 28, 2019 (JP) ................................. 2019-155373

(51) Int. Cl.
*H04B 1/00* (2006.01)
*H04B 1/04* (2006.01)

(52) U.S. Cl.
CPC ......... *H04B 1/0057* (2013.01); *H04B 1/0071* (2013.01); *H04B 1/04* (2013.01); *H04B 2001/0408* (2013.01)

(58) Field of Classification Search
None
See application file for complete search history.

(56) References Cited

U.S. PATENT DOCUMENTS

| 2003/0076194 A1 | 4/2003 | Machui |
| 2010/0069020 A1* | 3/2010 | Koya ............. H03K 17/687 327/306 |
| 2012/0208475 A1 | 8/2012 | Uejima |
| 2014/0203887 A1 | 7/2014 | Murata et al. |

(Continued)

FOREIGN PATENT DOCUMENTS

| CN | 105680896 A | 6/2016 |
| JP | 2003-517239 A | 5/2003 |

(Continued)

OTHER PUBLICATIONS

International Search Report for PCT/JP2020/022468 dated Sep. 8, 2020.

*Primary Examiner* — Khalid W Shaheed
(74) *Attorney, Agent, or Firm* — Pearne & Gordon LLP

(57) ABSTRACT

A radio-frequency module includes, for example, a low-band circuit configured to transfer a first transmit-signal group and a first receive-signal group in a low-band group, a middle-band circuit configured to transfer a second transmit-signal group and a second receive-signal group in a middle-band group, antenna connection terminals, a transmit-signal input terminal coupled to an output terminal of a power amplifier configured to amplify the first transmit-signal group, and a transmit-signal input terminal coupled to an output terminal of a power amplifier configured to amplify the second transmit-signal group. The low-band circuit includes duplexers, a switch, and a switch. The middle-band circuit includes duplexers, a switch, and a switch.

20 Claims, 7 Drawing Sheets

(56) References Cited

U.S. PATENT DOCUMENTS

2016/0164547 A1 6/2016 Kim et al.
2020/0359507 A1 11/2020 Chikita

FOREIGN PATENT DOCUMENTS

| JP | 2012-169798 A | 9/2012 | |
|---|---|---|---|
| JP | 2014-140115 A | 7/2014 | |
| WO | WO-2012103845 A2 * | 8/2012 | ............. H01Q 1/246 |
| WO | 2019/146284 A1 | 8/2019 | |

* cited by examiner

RADIO-FREQUENCY MODULE AND COMMUNICATION DEVICE

CROSS REFERENCE TO RELATED APPLICATION

This is a continuation of International Application No. PCT/JP2020/022468 filed on Jun. 8, 2020 which claims priority from Japanese Patent Application No. 2019-155373 filed on Aug. 28, 2019. The contents of these applications are incorporated herein by reference in their entireties.

BACKGROUND ART

Technical Field

The present disclosure relates to a radio-frequency module and a communication device.

Along with the development of multiband operation of mobile communication devices such as mobile phones, a need exists for modularized and miniaturized radio-frequency front-end circuits supporting two or more band groups out of a low-band group, a middle-band group, and a high-band group that are frequency bands for the fourth generation (4G) and fifth generation (5G) technology standards for cellular networks.

Patent Document 1 discloses a radio-frequency module formed by combining a transmit filter, a receive filter, and a switch element for switching connections of a terminal coupled to an antenna and terminals coupled to the respective filters.

Patent Document 1: Japanese Unexamined Patent Application Publication No. 2012-169798

BRIEF SUMMARY

The known radio-frequency module described above, however, cannot be made miniaturized because the radio-frequency module has many terminals for signal input and output and thus needs spaces for the terminals. When a circuit for transmit signal and a circuit for receive signal are combined together for the purpose of miniaturizing a radio-frequency module, sufficient isolation is necessary between the transmit and receive sides.

The present disclosure provides a miniaturized radio-frequency module and a miniaturized communication device with improved isolation between transmit and receive sides.

A radio-frequency module according to an aspect of the present disclosure includes a first communication circuit configured to transfer a first transmit-signal group and a first receive-signal group in a first band group composed of a plurality of first communication bands that include different frequency bands, a second communication circuit configured to transfer a second transmit-signal group and a second receive-signal group in a second band group composed of a plurality of second communication bands that are higher than the frequency bands of the plurality of first communication bands and that include different frequency bands, one or more antenna connection terminals, a first external connection terminal coupled to an output terminal of a first amplifier configured to amplify the first transmit-signal group, and a second external connection terminal coupled to an output terminal of a second amplifier configured to amplify the second transmit-signal group. The first communication circuit includes a plurality of first filters having pass bands individually corresponding to the plurality of first communication bands, a first antenna switch configured to control connection and disconnection between one of the one or more antenna connection terminals and the individual first filters, and a first transmit switch configured to control connection and disconnection between the first external connection terminal and the individual first filters. The second communication circuit includes a plurality of second filters having pass bands individually corresponding to the plurality of second communication bands, a second antenna switch configured to control connection and disconnection between one of the one or more antenna connection terminals and the individual second filters, and a second transmit switch configured to control connection and disconnection between the second external connection terminal and the individual second filters.

A communication device according to an aspect of the present disclosure includes the radio-frequency module and a radio-frequency (RF) signal processing circuit configured to process a radio-frequency signal received or to be transmitted by an antenna. The radio-frequency module is configured to transfer the radio-frequency signal between the antenna and the RF signal processing circuit.

The present disclosure can provide a miniaturized radio-frequency module and a miniaturized communication device with improved isolation between transmit and receive sides.

DETAILED DESCRIPTION

Figure 1:
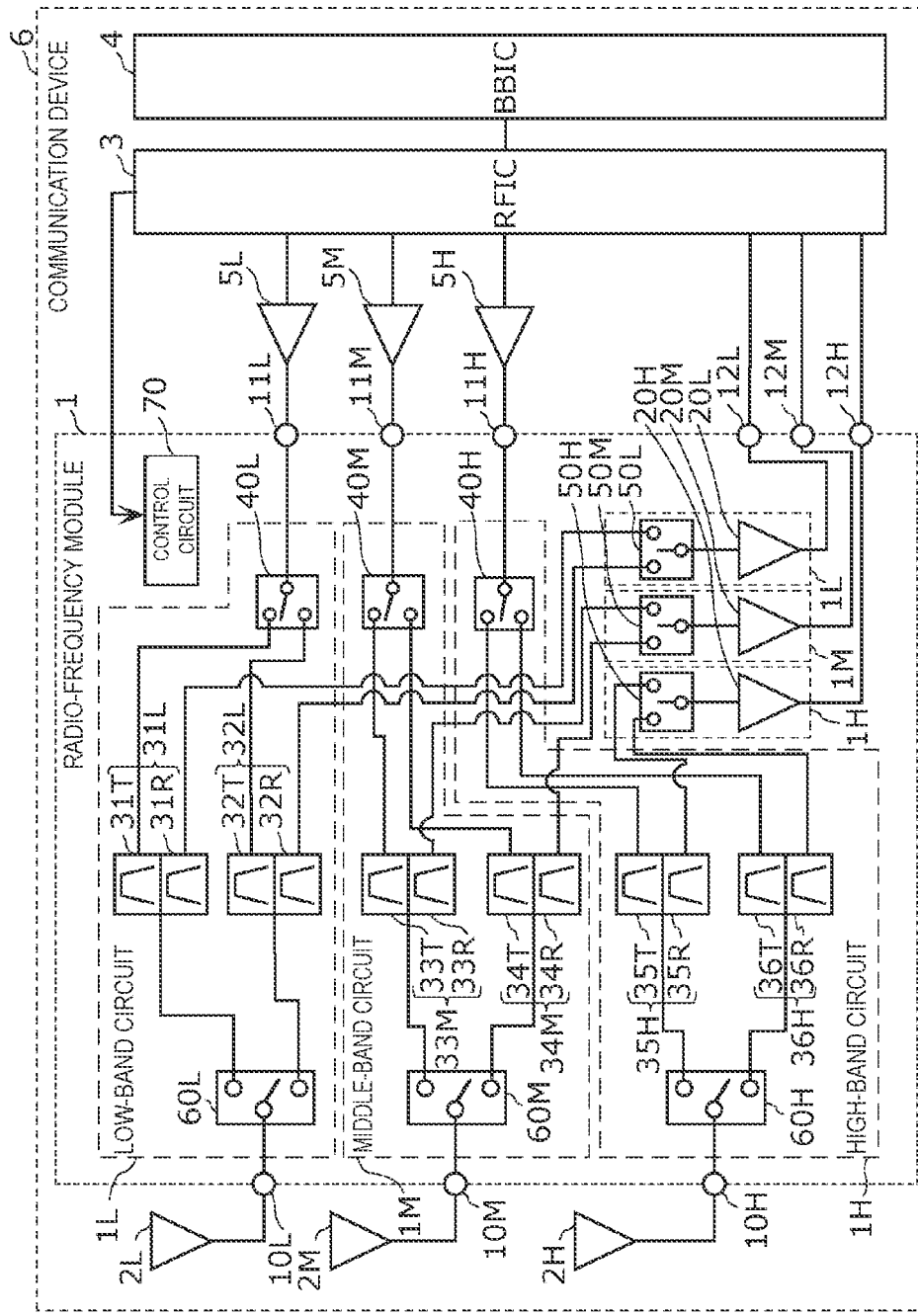
FIG. 1 is a circuit diagram of a radio-frequency module and a communication device according to an embodiment.

Hereinafter, a radio-frequency module and a communication device according to an embodiment of the present disclosure will be described in detail with reference to the drawings. It should be noted that the embodiment described below is one specific example of the present disclosure. Consequently, for example, numerical values, shapes, materials, constituent elements, arrangements of the constituent elements, connection modes of the constituent elements, steps, and the order of the steps given in the following embodiment are mere examples and are not intended to limit the present disclosure. Among the constituent elements in the following embodiment, constituent elements not recited in any of the independent claims are described as arbitrary constituent elements.

The drawings are schematic drawings and are not always depicted in an exact manner. Thus, for example, the drawings are not consistent in terms of scale. Like reference symbols are used to denote substantially like configurations in the drawings, and redundant descriptions thereof are omitted or simplified.

In this specification, words used to express relationships between elements, such as parallel, and numerical ranges do not necessarily denote the exact meanings but denote substantially the same meanings involving, for example, several percent differences.

Embodiment

1. Outline of Radio-Frequency Module and Communication Device

FIG. 1 is a circuit configuration diagram of a radio-frequency module 1 and a communication device 6 according to the present embodiment.

The radio-frequency module 1 according to the present embodiment transfers transmit-signal groups and receive-signal groups in a plurality of communication band groups. Specifically, the radio-frequency module 1 transfers transmit-signal groups in a low-band group, a middle-band group, and a high-band group and receive-signal groups in the low-band group, the middle-band group, and the high-band group.

The low-band group is an example of a first band group composed of a plurality of first communication bands that include different frequency bands. Specifically, the low-band group is a frequency-band group composed of a plurality of communication bands for the fourth generation (4G) and fifth generation (5G) technology standards for cellular networks. The low-band group covers, for example, a frequency range of 600-1000 MHz. The low-band group is composed of communication bands including, for example, Band 5 (transmit band: 824-849 MHz, receive band: 869-894 MHz), Band 8 (transmit band: 880-915 MHz, receive band: 925-960 MHz), and Band 28 (transmit band: 703-748 MHz, receive band: 753-803 MHz) of Long Term Evolution (LTE). Bands 5, 8, and 28 are an example of the plurality of first communication bands. As illustrated in FIG. 1, the radio-frequency module 1 includes a transmit switch 40L and a receive switch 50L for selecting one of the plurality of communication bands included in the low-band group.

The middle-band group is an example of a second band group composed of a plurality of second communication bands that are higher than the frequency bands of the first communication bands and that include different frequency bands. Specifically, the middle-band group is a frequency-band group composed of a plurality of communication bands for 4G and 5G. The middle-band group is located on the higher-frequency side with respect to the low-band group. The middle-band group covers, for example, a frequency range of 1.5-2.2 GHz. The middle-band group is composed of communication bands including, for example, LTE Band 1 (transmit band: 1920-1980 MHz, receive band: 2110-2170 MHz), Band 3 (transmit band: 1710-1785 MHz, receive band: 1805-1880 MHz), Band 39 (transmit and receive band: 1880-1920 MHz), and Band 66 (transmit band: 1710-1780 MHz, receive band: 2110-2200 MHz). Bands 1, 3, 39, and 66 are an example of the plurality of second communication bands. As illustrated in FIG. 1, the radio-frequency module 1 includes a transmit switch 40M and a receive switch 50M for selecting one of the plurality of communication bands included in the middle-band group.

The high-band group is an example of a third band group composed of a plurality of third communication bands that are higher than the frequency bands of the second communication bands and that include different frequency bands. Specifically, the high-band group is a frequency-band group composed of a plurality of communication bands for 4G and 5G. The high-band group is located on the higher-frequency side with respect to the middle-band group. The high-band group covers, for example, a frequency range of 2.4-2.8 GHz. The high-band group is composed of communication bands including, for example, LTE Band 7 (transmit band: 2500-2570 MHz, receive band: 2620-2690 MHz) and Band 41 (transmit and receive band 2496-2690 MHz). Bands 7 and 41 are an example of the plurality of third communication bands. As illustrated in FIG. 1, the radio-frequency module 1 includes a transmit switch 40H and a receive switch 50H for selecting one of the plurality of communication bands included in the high-band group.

As described above, the radio-frequency module 1 includes the transmit switches 40L, 40M, and 40H and the receive switches 50L, 50M, and 50H that are configured to select one of a plurality of communication bands. As will be described in detail later, a common terminal of each switch is coupled to a corresponding external connection terminal of the radio-frequency module 1. As a result, it is possible to output transmit signals in a plurality of communication bands included in, for example, the low-band group from one external connection terminal. The same holds for the middle-band group and the high-band group. The same also holds for receive signals in the communication band groups. The number of external connection terminals provided in the radio-frequency module 1 is less than if external connection terminals are provided for individual communication bands, and consequently, the radio-frequency module 1 can be downsized.

In the present embodiment, at least one of the second communication bands includes nth harmonic frequencies of frequencies included in at least one of the first communication bands, where n is a natural number equal to or greater than 2. Similarly, at least one of the third communication bands includes mth harmonic frequencies of frequencies included in at least one of the first communication bands, where m is a natural number equal to or greater than 3.

Specifically, the communication bands included in the middle-band group includes second-harmonic frequencies of frequencies included in the communication band included in the low-band group. For example, the receive band (1805-1880 MHz) of Band 3 of the middle-band group includes second-harmonic frequencies of frequencies included in the transmit band (880-915 MHz) of Band 8 of the low-band group. Consequently, when transmit signals in Band 8 of the low-band group enter into the receive circuit for the middle-band group, the transmit signals may affect receive signals in Band 3 of the middle-band group.

The communication bands included in the high-band group includes a third-harmonic frequency of a frequency included in the communication band included in the low-band group. For example, the receive band (2620-2690 MHz) of Band 7 of the high-band group includes third-harmonic frequencies of frequencies included in the transmit band (880-915 MHz) of Band 8 of the low-band group.

Consequently, when transmit signals in Band 8 of the low-band group enter into the receive circuit for the high-band group, the transmit signals may affect receive signals in Band 7 of the high-band group.

For this reason, it is suitable to provide sufficient isolation between transmit and receive sides in the radio-frequency module 1. In particular, it is suitable to provide isolation between the transmit circuit for the low-band group, and the receive circuit for the middle-band group and the receive circuit for the high-band group. In the present embodiment, isolation between transmit and receive sides is provide by separately forming (modularizing) the radio-frequency module 1 and the power amplifiers 5L, 5M, and 5H for amplifying transmit-signal groups of the respective communication band groups.

2. Circuit Configuration of Radio-Frequency Module and Communication Device

As illustrated in FIG. 1, the communication device 6 includes the radio-frequency module 1, antennas 2L, 2M, and 2H, a radio-frequency signal processing circuit (RFIC) 3, a baseband signal processing circuit (BBIC) 4, and the power amplifiers 5L, 5M, and 5H.

The antenna 2L is coupled to an antenna connection terminal 10L of the radio-frequency module 1. The antenna 2L emits a transmit signal outputted from a low-band circuit 1L of the radio-frequency module 1. The antenna 2L also receives a receive signal from outside and outputs the receive signal to the low-band circuit 1L.

The antenna 2M is coupled to an antenna connection terminal 10M of the radio-frequency module 1. The antenna 2M emits a transmit signal outputted from a middle-band circuit 1M of the radio-frequency module 1. The antenna 2M receives a receive signal from outside and outputs the receive signal to the middle-band circuit 1M.

The antenna 2H is coupled to an antenna connection terminal 10H of the radio-frequency module 1. The antenna 2H emits a transmit signal outputted from a high-band circuit 1H of the radio-frequency module 1. The antenna 2H also receives a receive signal from outside and outputs the receive signal to the high-band circuit 1H.

The RFIC 3 is a radio-frequency signal processing circuit configured to process radio-frequency signals received or to be transmitted by the antennas 2L, 2M, and 2H. Specifically, the RFIC 3 processes by, for example, down-conversion a radio-frequency receive signal received by the antenna 2L, 2M, or 2H and inputted through a receive-signal path of the radio-frequency module 1. The RFIC 3 outputs the receive signal generated by signal processing to the BBIC 4. The RFIC 3 also processes by, for example, up-conversion a transmit signal inputted from the BBIC 4. The RFIC 3 outputs the radio-frequency transmit signal generated by the signal processing to a transmit-signal path of the radio-frequency module 1. The radio-frequency transmit signal is transferred through the transmit-signal path of the radio-frequency module 1 and emitted by the antenna 2L, 2M, or 2H.

The RFIC 3 also functions as a controller for providing control to switch connections of switches included in the radio-frequency module 1 in accordance with the communication band that is being used. Specifically, the RFIC 3 outputs to a control circuit 70 of the radio-frequency module 1 a control signal for switching connections of the switches 40L, 40M, and 40H, the switches 50L, 50M, and 50H, and switches 60L, 60M, and 60H that are included in the radio-frequency module 1. The RFIC 3 also outputs to the control circuit 70 a control signal for controlling, for example, the gain of low-noise amplifiers 20L, 20M, and 20H of the radio-frequency module 1. The RFIC 3 also outputs to a control circuit (not illustrated in the drawing) of the power amplifiers 5L, 5M, and 5H a control signal for controlling, for example, the gain of the power amplifiers 5L, 5M, and 5H.

The control circuit 70 does not necessarily control all the switches 40L, 40M, and 40H, the switches 50L, 50M, and 50H, the switches 60L, 60M, and 60H, and the low-noise amplifiers 20L, 20M, and 20H. The function implemented by the control circuit 70 may be provided individually in the switches 40L, 40M, and 40H, the switches 50L, 50M, and 50H, the switches 60L, 60M, and 60H, and the low-noise amplifiers 20L, 20M, and 20H.

The BBIC 4 may implement the function of the controller implemented by the RFIC 3 in the above description. Alternatively, the communication device 6 may include a control circuit different from the RFIC 3 and the BBIC 4 to implement the function.

The BBIC 4 performs signal processing by using an intermediate frequency band lower than radio-frequency signals transferred in the radio-frequency module 1. The signal processed by the BBIC 4 is used as, for example, an image signal for displaying an image or a sound signal for talk through a speaker.

The power amplifier 5L is an example of a first amplifier for amplifying a first transmit-signal group in the first band group. Specifically, the power amplifier 5L is a transmit power amplifier for amplifying transmit signals in the communication bands included in the low-band group. The transmit signals in the communication bands included in the low-band group are an example of transmit signals included in the first transmit-signal group. The first transmit-signal group is constituted by transmit signals in the first communication bands included in the first band group.

The power amplifier 5M is an example of a second amplifier for amplifying a second transmit-signal group of the second band group. Specifically, the power amplifier 5M is a transmit power amplifier for amplifying transmit signals in the communication bands included in the middle-band group. The transmit signals in the communication bands included in the middle-band group are an example of transmit signals included in the second transmit-signal group. The second transmit-signal group is constituted by transmit signals in the second communication bands included in the second band group.

The power amplifier 5H is an example of a third amplifier for amplifying a third transmit-signal group of the third band group. Specifically, the power amplifier 5H is a transmit power amplifier for amplifying transmit signals in the communication bands included in the high-band group. The transmit signals in the communication bands included in the high-band group are an example of transmit signals included in the third transmit-signal group. The third transmit-signal group is constituted by transmit signals in the third communication bands included in the third band group.

The power amplifiers 5L, 5M, and 5H are implemented by, for example, silicon (Si)-based complementary metal oxide semiconductor (CMOS) devices, or gallium arsenide (GaAs)-based field-effect transistors (FETs) or heterojunction bipolar transistors (HBTs). The power amplifiers 5L, 5M, and 5H are not limited to any particular configuration.

In the communication device 6 according to the present embodiment, the antennas 2L, 2M, and 2H, and the BBIC 4 are optional constituent elements. This means that the communication device 6 may exclude at least one of the antennas 2L, 2M, and 2H, the RFIC 3, and the BBIC 4.

Next, details of the configuration of the radio-frequency module 1 will be described.

As illustrated in FIG. 1, the radio-frequency module 1 includes the low-band circuit 1L, the middle-band circuit 1M, the high-band circuit 1H, the antenna connection terminals 10L, 10M, and 10H, transmit-signal input terminals 11L, 11M, and 11H, and receive-signal output terminals 12L, 12M, and 12H.

The antenna connection terminals 10L, 10M, and 10H are each an example of an external connection terminal for electrically coupling the radio-frequency module 1 to an element provided outside the radio-frequency module 1. Specifically, the antenna connection terminal 10L is coupled to the antenna 2L. The antenna connection terminal 10M is coupled to the antenna 2M. The antenna connection terminal 10H is coupled to the antenna 2H.

The transmit-signal input terminals 11L, 11M, and 11H are each an example of an external connection terminal for electrically coupling the radio-frequency module 1 to an element provided outside the radio-frequency module 1. Specifically, the transmit-signal input terminal 11L is an example of a first external connection terminal coupled to an output terminal of the power amplifier 5L. The first transmit-signal group amplified by the power amplifier 5L is inputted to the transmit-signal input terminal 11L. The transmit-signal input terminal 11M is an example of a second external connection terminal coupled to an output terminal of the power amplifier 5M. The second transmit-signal group amplified by the power amplifier 5M is inputted to the transmit-signal input terminal 11M. The transmit-signal input terminal 11H is an example of a third external connection terminal coupled to an output terminal of the power amplifier 5H. The third transmit-signal group amplified by the power amplifier 5H is inputted to the transmit-signal input terminal 11H.

Although not illustrated in FIG. 1, a matching circuit may be disposed between the power amplifier 5L and the transmit-signal input terminal 11L to provide impedance matching between the power amplifier 5L and the transmit-signal input terminal 11L. A matching circuit may be disposed between the power amplifier 5M and the transmit-signal input terminal 11M to provide impedance matching between the power amplifier 5M and the transmit-signal input terminal 11M. A matching circuit may be disposed between the power amplifier 5H and the transmit-signal input terminal 11H to provide impedance matching between the power amplifier 5H and the transmit-signal input terminal 11H.

These matching circuits (matching circuit for power amplifier) may be, but not limited to, matching circuits each including, for example, an inductor and a capacitor. The matching circuit for power amplifier does not necessarily include an inductor or capacitor. The matching circuit for power amplifier may be provided outside the radio-frequency module 1.

The receive-signal output terminals 12L, 12M, and 12H are each an example of an external connection terminal for electrically coupling the radio-frequency module 1 to an element provided outside the radio-frequency module 1. Specifically, the receive-signal output terminals 12L, 12M, and 12H are all coupled to the RFIC 3.

The low-band circuit 1L is an example of a first communication circuit for transferring the first transmit-signal group and a first receive-signal group in the first band group. Specifically, the low-band circuit 1L transfers transmit and receive signals in the communication bands included in the low-band group. As illustrated in FIG. 1, the low-band circuit 1L includes the low-noise amplifier 20L, duplexers 31L and 32L, and the switches 40L, 50L, and 60L.

Although not illustrated in FIG. 1, the low-band circuit 1L may include, for example, matching circuits disposed between the elements to provide impedance matching and a filter circuit for limiting the pass band of transmit or receive signal. For example, a filter configured to pass both transmit and receive signals in the low-band group may be disposed between the antenna connection terminal 10L and the switch 60L. A matching circuit (matching circuit for filter) may be provided between the switch 60L and the duplexer 31L to provide impedance matching between the switch 60L and the duplexer 31L. A matching circuit (matching circuit for filter) may be provided between the switch 60L and the duplexer 32L to provide impedance matching between the switch 60L and the duplexer 32L. A matching circuit (matching circuit for low-noise amplifier (LNA)) may be disposed between the low-noise amplifier 20L and the switch 50L to provide impedance matching between the low-noise amplifier 20L and the switch 50L.

These matching circuit for filter and matching circuit for LNA may be, but not limited to, matching circuits each including, for example, an inductor and a capacitor. The matching circuit for filter and matching circuit for LNA do not necessarily include an inductor or capacitor.

The low-noise amplifier 20L is an example of a first low-noise amplifier for amplifying the first receive-signal group in the first band group. Specifically, the low-noise amplifier 20L is a receive low-noise amplifier for amplifying with low noise receive signals in the communication bands included in the low-band group. The receive signals in the communication bands included in the low-band group are an example of receive signals included in the first receive-signal group. The first receive-signal group is constituted by receive signals in the first communication bands included in the first band group.

The duplexers 31L and 32L are an example of a plurality of first filters having pass bands corresponding to the respective first communication bands. The pass band of the duplexer 31L is different from the pass band of the duplexer 32L.

The duplexer 31L passes, for example, radio-frequency signals in a communication band A of the low-band group. As illustrated in FIG. 1, the duplexer 31L is composed of a transmit filter 31T and a receive filter 31R. An input terminal of the transmit filter 31T is coupled to the transmit-signal input terminal 11L via the switch 40L. An output terminal of the receive filter 31R is coupled to the receive-signal output terminal 12L via the switch 50L and the low-noise amplifier 20L. An output terminal of the transmit filter 31T and an input terminal of the receive filter 31R are coupled to each other to form a common terminal; the common terminal is coupled to the antenna connection terminal 10L via the switch 60L.

The transmit filter 31T is disposed in a transmit-signal path connecting the transmit-signal input terminal 11L and the antenna connection terminal 10L. The transmit filter 31T passes transmit signals in the transmit band of the communication band A out of the transmit signals amplified by the power amplifier 5L and inputted from the transmit-signal input terminal 11L. The receive filter 31R is disposed in a receive-signal path connecting the antenna connection terminal 10L and the receive-signal output terminal 12L. The receive filter 31R passes receive signals in the receive band of the communication band A out of the receive signals inputted from the antenna connection terminal 10L.

The duplexer 32L passes, for example, radio-frequency signals in a communication band B of the low-band group. The communication band B is different from the communication band A. As illustrated in FIG. 1, the duplexer 32L is composed of a transmit filter 32T and a receive filter 32R. An input terminal of the transmit filter 32T is coupled to the transmit-signal input terminal 11L via the switch 40L. An output terminal of the receive filter 32R is coupled to the receive-signal output terminal 12L via the switch 50L and the low-noise amplifier 20L. An output terminal of the transmit filter 32T and an input terminal of the receive filter 32R are coupled to each other to form a common terminal; the common terminal is coupled to the antenna connection terminal 10L via the switch 60L.

The transmit filter 32T is disposed in a transmit-signal path connecting the transmit-signal input terminal 11L and the antenna connection terminal 10L. The transmit filter 32T passes transmit signals in the transmit band of the communication band B out of the transmit signals amplified by the power amplifier 5L and inputted from the transmit-signal input terminal 11L. The receive filter 32R is disposed in a receive-signal path connecting the antenna connection terminal 10L and the receive-signal output terminal 12L. The receive filter 32R passes receive signals in the receive band of the communication band B out of the receive signals inputted from the antenna connection terminal 10L.

The switch 40L is an example of a first transmit switch for controlling connection and disconnection between the first external connection terminal and the individual first filters. Specifically, the switch 40L controls connection and disconnection between the transmit-signal input terminal 11L and the duplexers 31L and 32L. More specifically, the switch 40L is disposed in a transmit-signal path connecting the transmit-signal input terminal 11L and the transmit filters 31T and 32T. The switch 40L controls connection and disconnection between the transmit-signal input terminal 11L and the transmit filter 31T, and connection and disconnection between the transmit-signal input terminal 11L and the transmit filter 32T.

The switch 40L is, for example, a single pole double throw (SPDT) switch having a common terminal and two selection terminals. The common terminal is coupled to the transmit-signal input terminal 11L. One of the two selection terminals is coupled to the input terminal of the transmit filter 31T. The other of the two selection terminals is coupled to the input terminal of the transmit filter 32T.

The switch 50L is an example of a first receive switch for controlling connection and disconnection between the individual first filters and the first low-noise amplifier. Specifically, the switch 50L controls connection and disconnection between the individual duplexers 31L and 32L and an input terminal of the low-noise amplifier 20L. More specifically, the switch 50L is disposed in a receive-signal path connecting the receive filters 31R and 32R and the low-noise amplifier 20L. The switch 50L controls connection and disconnection between the receive filter 31R and the low-noise amplifier 20L, and connection and disconnection between the receive filter 32R and the low-noise amplifier 20L.

The switch 50L is, for example, a SPDT switch having a common terminal and two selection terminals. The common terminal is coupled to the input terminal of the low-noise amplifier 20L. One of the two selection terminals is coupled to the output terminal of the receive filter 31R. The other of the two selection terminals is coupled to the output terminal of the receive filter 32R.

The switch 60L is an example of a first antenna switch for controlling connection and disconnection between one of one or more antenna connection terminals and the individual first filters. Specifically, the switch 60L controls connection and disconnection between the antenna connection terminal 10L and the individual duplexers 31L and 32L.

The switch 60L is, for example, a SPDT switch having a common terminal and two selection terminals. The common terminal is coupled to the antenna connection terminal 10L. One of the two selection terminals is coupled to the common terminal of the duplexer 31L. The other of the two selection terminals is coupled to the common terminal of the duplexer 32L. The switch 60L can stop radio-frequency signals in the low-band group from being transferred by the low-band circuit 1L by disconnecting the common terminal from the two selection terminals. This means that the switch 60L can control connection and disconnection between the low-band circuit 1L and the antenna 2L.

The number of communication bands transferred by the low-band circuit 1L is not limited to two; the low-band circuit 1L may transfer only one communication band, or three or more communication bands. In accordance with the number of communication bands, configurations such as the number of duplexers and the configuration of the switch (for example, the number of selection terminals) are changed as appropriate.

The middle-band circuit 1M is an example of a second communication circuit for transferring the second transmit-signal group and a second receive-signal group in the second band group. Specifically, the middle-band circuit 1M transfers transmit and receive signals in the communication bands included in the middle-band group. As illustrated in FIG. 1, the middle-band circuit 1M includes the low-noise amplifier 20M, duplexers 33M and 34M, and the switches 40M, 50M, and 60M.

Although not illustrated in FIG. 1, the middle-band circuit 1M may include, for example, matching circuits disposed between the elements to provide impedance matching and a filter circuit for limiting the pass band of transmit or receive signal. For example, a filter configured to pass both transmit and receive signals in the middle-band group may be disposed between the antenna connection terminal 10M and the switch 60M. A matching circuit (matching circuit for filter) may be provided between the switch 60M and the duplexer 33M to provide impedance matching between the switch 60M and the duplexer 33M. A matching circuit (matching circuit for filter) may be provided between the switch 60M and the duplexer 34M to provide impedance matching between the switch 60M and the duplexer 34M. A matching circuit (matching circuit for low-noise amplifier (LNA)) may be disposed between the low-noise amplifier 20M and the switch 50M to provide impedance matching between the low-noise amplifier 20M and the switch 50M.

These matching circuit for filter and matching circuit for LNA may be, but not limited to, matching circuits each including, for example, an inductor and a capacitor. The matching circuit for filter and matching circuit for LNA do not necessarily include an inductor or capacitor.

The low-noise amplifier 20M is an example of a second low-noise amplifier for amplifying the second receive-signal group in the second band group. Specifically, the low-noise amplifier 20M is a receive low-noise amplifier for amplifying with low noise receive signals in the communication bands included in the middle-band group. The receive signals in the communication bands included in the middle-band group are an example of receive signals included in the second receive-signal group. The second receive-signal group is constituted by receive signals in the second communication bands included in the second band group.

The duplexers 33M and 34M are an example of a plurality of second filters having pass bands corresponding to the respective second communication bands. The pass band of the duplexer 33M is different from the pass band of the duplexer 34M.

The duplexer 33M passes, for example, radio-frequency signals in a communication band C of the middle-band group. As illustrated in FIG. 1, the duplexer 33M is composed of a transmit filter 33T and a receive filter 33R. An input terminal of the transmit filter 33T is coupled to the transmit-signal input terminal 11M via the switch 40M. An output terminal of the receive filter 33R is coupled to the receive-signal output terminal 12M via the switch 50M and the low-noise amplifier 20M. An output terminal of the transmit filter 33T and an input terminal of the receive filter 33R are coupled to each other to form a common terminal; the common terminal is coupled to the antenna connection terminal 10M via the switch 60M.

The transmit filter 33T is disposed in a transmit-signal path connecting the transmit-signal input terminal 11M and the antenna connection terminal 10M. The transmit filter 33T passes transmit signals in the transmit band of the communication band C out of the transmit signals amplified by the power amplifier 5M and inputted from the transmit-signal input terminal 11M. The receive filter 33R is disposed in a receive-signal path connecting the antenna connection terminal 10M and the receive-signal output terminal 12M. The receive filter 33R passes receive signals in the receive band of the communication band C out of the receive signals inputted from the antenna connection terminal 10M.

The duplexer 34M passes, for example, radio-frequency signals in a communication band D of the middle-band group. The communication band D is different from the communication band C. As illustrated in FIG. 1, the duplexer 34M is composed of a transmit filter 34T and a receive filter 34R. An input terminal of the transmit filter 34T is coupled to the transmit-signal input terminal 11M via the switch 40M. An output terminal of the receive filter 34R is coupled to the receive-signal output terminal 12M via the switch 50M and the low-noise amplifier 20M. An output terminal of the transmit filter 34T and an input terminal of the receive filter 34R are coupled to each other to form a common terminal; the common terminal is coupled to the antenna connection terminal 10M via the switch 60M.

The transmit filter 34T is disposed in a transmit-signal path connecting the transmit-signal input terminal 11M and the antenna connection terminal 10M. The transmit filter 34T passes transmit signals in the transmit band of the communication band D out of the transmit signals amplified by the power amplifier 5M and inputted from the transmit-signal input terminal 11M. The receive filter 34R is disposed in a receive-signal path connecting the antenna connection terminal 10M and the receive-signal output terminal 12M. The receive filter 34R passes receive signals in the receive band of the communication band D out of the receive signals inputted from the antenna connection terminal 10M.

The switch 40M is an example of a second transmit switch for controlling connection and disconnection between the second external connection terminal and the individual second filters. Specifically, the switch 40M controls connection and disconnection between the transmit-signal input terminal 11M and the duplexers 33M and 34M. More specifically, the switch 40M is disposed in a transmit-signal path connecting the transmit-signal input terminal 11M and the transmit filters 33T and 34T. The switch 40M controls connection and disconnection between the transmit-signal input terminal 11M and the transmit filter 33T, and connection and disconnection between the transmit-signal input terminal 11M and the transmit filter 34T.

The switch 40M is, for example, a SPDT switch having a common terminal and two selection terminals. The common terminal is coupled to the transmit-signal input terminal 11M. One of the two selection terminals is coupled to the input terminal of the transmit filter 33T. The other of the two selection terminals is coupled to the input terminal of the transmit filter 34T.

The switch 50M is an example of a second receive switch for controlling connection and disconnection between the individual second filters and the second low-noise amplifier. Specifically, the switch 50M controls connection and disconnection between the individual duplexers 33M and 34M and an input terminal of the low-noise amplifier 20M. More specifically, the switch 50M is disposed in a receive-signal path connecting the receive filters 33R and 34R and the low-noise amplifier 20M. The switch 50M controls connection and disconnection between the receive filter 33R and the low-noise amplifier 20M, and connection and disconnection between the receive filter 34R and the low-noise amplifier 20M.

The switch 50M is, for example, a SPDT switch having a common terminal and two selection terminals. The common terminal is coupled to the input terminal of the low-noise amplifier 20M. One of the two selection terminals is coupled to the output terminal of the receive filter 33R. The other of the two selection terminals is coupled to the output terminal of the receive filter 34R.

The switch 60M is an example of a second antenna switch for controlling connection and disconnection between one of one or more antenna connection terminals and the individual second filters. Specifically, the switch 60M controls connection and disconnection between the antenna connection terminal 10M and the duplexers 33M and 34M.

The switch 60M is, for example, a SPDT switch having a common terminal and two selection terminals. The common terminal is coupled to the antenna connection terminal 10M. One of the two selection terminals is coupled to the common terminal of the duplexer 33M. The other of the two selection terminals is coupled to the common terminal of the duplexer 34M. The switch 60M can stop radio-frequency signals in the middle-band group from being transferred by the middle-band circuit 1M by disconnecting the common terminal from the two selection terminals. This means that the switch 60M can control connection and disconnection between the middle-band circuit 1M and the antenna 2M.

The number of communication bands transferred by the middle-band circuit 1M is not limited to two; the middle-band circuit 1M may transfer only one communication band, or three or more communication bands. In accordance with the number of communication bands, configurations such as the number of duplexers and the configuration of the switch (for example, the number of selection terminals) are changed as appropriate.

The high-band circuit 1H is an example of a third communication circuit for transferring the third transmit-signal group and a third receive-signal group in the third band group. Specifically, the high-band circuit 1H transfers transmit and receive signals in the communication bands included in the high-band group. As illustrated in FIG. 1, the high-band circuit 1H includes the low-noise amplifier 20H, duplexers 35H and 36H, and the switches 40H, 50H, and 60H.

Although not illustrated in FIG. 1, the high-band circuit 1H may include, for example, matching circuits disposed between the elements to provide impedance matching and a filter circuit for limiting the pass band of transmit or receive signal. For example, a filter configured to pass both transmit and receive signals in the high-band group may be disposed between the antenna connection terminal 10H and the switch 60H. A matching circuit (matching circuit for filter) may be provided between the switch 60H and the duplexer 35H to provide impedance matching between the switch 60H and the duplexer 35H. A matching circuit (matching circuit for filter) may be provided between the switch 60H and the duplexer 36H to provide impedance matching between the switch 60H and the duplexer 36H. A matching circuit (matching circuit for low-noise amplifier (LNA)) may be disposed between the low-noise amplifier 20H and the switch 50H to provide impedance matching between the low-noise amplifier 20H and the switch 50H.

These matching circuit for filter and matching circuit for LNA may be, but not limited to, matching circuits each including, for example, an inductor and a capacitor. The matching circuit for filter and matching circuit for LNA do not necessarily include an inductor or capacitor.

The low-noise amplifier 20H is an example of a third low-noise amplifier for amplifying the third receive-signal group in the third band group. Specifically, the low-noise amplifier 20H is a receive low-noise amplifier for amplifying with low noise receive signals in the communication bands included in the high-band group. The receive signals in the communication bands included in the high-band group are an example of receive signals included in the third receive-signal group. The third receive-signal group is constituted by receive signals in the third communication bands included in the third band group.

The duplexers 35H and 36H are an example of a plurality of third filters having pass bands corresponding to the respective third communication bands. The pass band of the duplexer 35H is different from the pass band of the duplexer 36H.

The duplexer 35H passes, for example, radio-frequency signals in a communication band E of the high-band group. As illustrated in FIG. 1, the duplexer 35H is composed of a transmit filter 35T and a receive filter 35R. An input terminal of the transmit filter 35T is coupled to the transmit-signal input terminal 11H via the switch 40H. An output terminal of the receive filter 35R is coupled to the receive-signal output terminal 12H via the switch 50H and the low-noise amplifier 20H. An output terminal of the transmit filter 35T and an input terminal of the receive filter 35R are coupled to each other to form a common terminal; the common terminal is coupled to the antenna connection terminal 10H via the switch 60H.

The transmit filter 35T is disposed in a transmit-signal path connecting the transmit-signal input terminal 11H and the antenna connection terminal 10H. The transmit filter 35T passes transmit signals in the transmit band of the communication band E out of the transmit signals amplified by the power amplifier 5H and inputted from the transmit-signal input terminal 11H. The receive filter 35R is disposed in a receive-signal path connecting the antenna connection terminal 10H and the receive-signal output terminal 12H. The receive filter 35R passes receive signals in the receive band of the communication band E out of the receive signals inputted from the antenna connection terminal 10H.

The duplexer 36H passes, for example, radio-frequency signals in a communication band F of the high-band group. The communication band F is different from the communication band E. As illustrated in FIG. 1, the duplexer 36H is composed of a transmit filter 36T and a receive filter 36R. An input terminal of the transmit filter 36T is coupled to the transmit-signal input terminal 11H via the switch 40H. An output terminal of the receive filter 36R is coupled to the receive-signal output terminal 12H via the switch 50H and the low-noise amplifier 20H. An output terminal of the transmit filter 36T and an input terminal of the receive filter 36R are coupled to each other to form a common terminal; the common terminal is coupled to the antenna connection terminal 10H via the switch 60H.

The transmit filter 36T is disposed in a transmit-signal path connecting the transmit-signal input terminal 11H and the antenna connection terminal 10H. The transmit filter 36T passes transmit signals in the transmit band of the communication band F out of the transmit signals amplified by the power amplifier 5H and inputted from the transmit-signal input terminal 11H. The receive filter 36R is disposed in a receive-signal path connecting the antenna connection terminal 10H and the receive-signal output terminal 12H. The receive filter 36R passes receive signals in the receive band of the communication band F out of the receive signals inputted from the antenna connection terminal 10H.

The switch 40H is an example of a third transmit switch for controlling connection and disconnection between the third external connection terminal and the individual third filters. Specifically, the switch 40H controls connection and disconnection between the transmit-signal input terminal 11H and the duplexers 35H and 36H. More specifically, the switch 40H is disposed in a transmit-signal path connecting the transmit-signal input terminal 11H and the transmit filters 35T and 36T. The switch 40H controls connection and disconnection between the transmit-signal input terminal 11H and the transmit filter 35T, and connection and disconnection between the transmit-signal input terminal 11H and the transmit filter 36T.

The switch 40H is, for example, a SPDT switch having a common terminal and two selection terminals. The common terminal is coupled to the transmit-signal input terminal 11H. One of the two selection terminals is coupled to the input terminal of the transmit filter 35T. The other of the two selection terminals is coupled to the input terminal of the transmit filter 36T.

The switch 50H is an example of a third receive switch for controlling connection and disconnection between the individual third filters and the third low-noise amplifier. Specifically, the switch 50H controls connection and disconnection between the individual duplexers 35H and 36H and an input terminal of the low-noise amplifier 20H. More specifically, the switch 50H is disposed in a receive-signal path connecting the receive filters 35R and 36R and the low-noise amplifier 20H. The switch 50H controls connection and disconnection between the receive filter 35R and the low-noise amplifier 20H, and connection and disconnection between the receive filter 36R and the low-noise amplifier 20H.

The switch 50H is, for example, a SPDT switch having a common terminal and two selection terminals. The common terminal is coupled to the input terminal of the low-noise amplifier 20H. One of the two selection terminals is coupled to the output terminal of the receive filter 35R. The other of the two selection terminals is coupled to the output terminal of the receive filter 36R.

The switch 60H is an example of a third antenna switch for controlling connection and disconnection between one of one or more antenna connection terminals and the individual third filters. Specifically, the switch 60H controls connection and disconnection between the antenna connection terminal 10H and the duplexers 35H and 36H.

The switch 60H is, for example, a SPDT switch having a common terminal and two selection terminals. The common terminal is coupled to the antenna connection terminal 10H. One of the two selection terminals is coupled to the common terminal of the duplexer 35H. The other of the two selection terminals is coupled to the common terminal of the duplexer 36H. The switch 60H can stop radio-frequency signals in the high-band group from being transferred by the high-band circuit 1H by disconnecting the common terminal from the two selection terminals. This means that the switch 60H can control connection and disconnection between the high-band circuit 1H and the antenna 2H.

The number of communication bands transferred by the high-band circuit 1H is not limited to two; the high-band circuit 1H may transfer only one communication band, or three or more communication bands. In accordance with the number of communication bands, configurations such as the number of duplexers and the configuration of the switch (for example, the number of selection terminals) are changed as appropriate.

The low-noise amplifiers 20L, 20M, and 20H are implemented by, for example, Si-based CMOS devices, or GaAs FETs or HBTs. The low-noise amplifiers 20L, 20M, and 20H are not limited to any particular configuration.

The transmit filters 31T to 36T and the receive filters 31R to 36R are, but not limited to, for example, surface acoustic wave (SAW) filters, bulk acoustic wave (BAW) filters, LC resonance filters, or dielectric filters. The same holds for the filters provided between the antenna connection terminals 10L, 10M, and 10H and the switches 60L, 60M and 60H.

With the circuit configuration described above, the radio-frequency module 1 according to the present embodiment can at least transmit, receive, or transmit and receive radio-frequency signals in only one communication band out of the communication bands A to F. Alternatively, the radio-frequency module 1 according to the present embodiment can at least simultaneously transmit, simultaneously receive, or simultaneously transmit and receive radio-frequency signals in two or more communication bands out of the communication bands A to F.

The control circuit 70 may synchronize the operation of the low-band circuit 1L, the operation of the middle-band circuit 1M, and the operation of the high-band circuit 1H. For example, when the low-band circuit 1L transfers a transmit signal, the control circuit 70 may couple terminals included in the switches 40M, 50M, and 60M of the middle-band circuit 1M and the switches 40H, 50H, and 60H of the high-band circuit 1H to a ground terminal. As a result, when the transmit signal in the low-band circuit 1L enters into the middle-band circuit 1M or the high-band circuit 1H, this configuration can reduce effects on the radio-frequency signal transferred in the middle-band circuit 1M or the high-band circuit 1H.

As described above, the radio-frequency module 1 according to the present embodiment includes the switches 40L, 40M, and 40H for transmit signal. If the radio-frequency module 1 do not have the switches 40L, 40M, and 40H, the radio-frequency module 1 needs transmit-signal input terminals equal in number to the selection terminals of the switches 40L, 40M, and 40H. The number of selection terminals in each switch is equal to the number of communication bands. Thus, as the communication bands increase, transmit-signal input terminals also increase, which makes miniaturization of the radio-frequency module 1 difficult.

By contrast, in the radio-frequency module 1 according to the present embodiment, the number of transmit-signal input terminals is equal to the number of the common terminals of the switches. In the example illustrated in FIG. 1, the radio-frequency module 1 needs only the three transmit-signal input terminals 11L, 11M, and 11H, which are half of six transmit-signal input terminals required in the radio-frequency module 1 if the radio-frequency module 1 does not include the switches 40L, 40M, and 40H. As such, because the radio-frequency module 1 includes the switches 40L, 40M, and 40H for transmit signal, the number of external connection terminals included in the radio-frequency module 1 is reduced, and as a result, the radio-frequency module 1 can be miniaturized. When the number of communication bands increases, the radio-frequency module 1 can be miniaturized without necessarily increasing transmit-signal input terminals.

Further, the radio-frequency module 1 according to the present embodiment does not include the power amplifiers 5L, 5M, and 5H; in other words, the power amplifiers 5L, 5M, and 5H are formed (modularized) separately from the radio-frequency module 1. This configuration provides isolation between transmit and receive sides.

In the radio-frequency module 1, transmit signals amplified by the power amplifiers 5L, 5M, and 5H are transferred. The elements in the radio-frequency module 1 according to the present embodiment are thus suitably arranged to provide more sufficient isolation. The following provides detailed descriptions of arrangements of the elements included in the radio-frequency module 1 with the use of practical examples.

3. Arrangements of Circuit Elements

Figure 2:
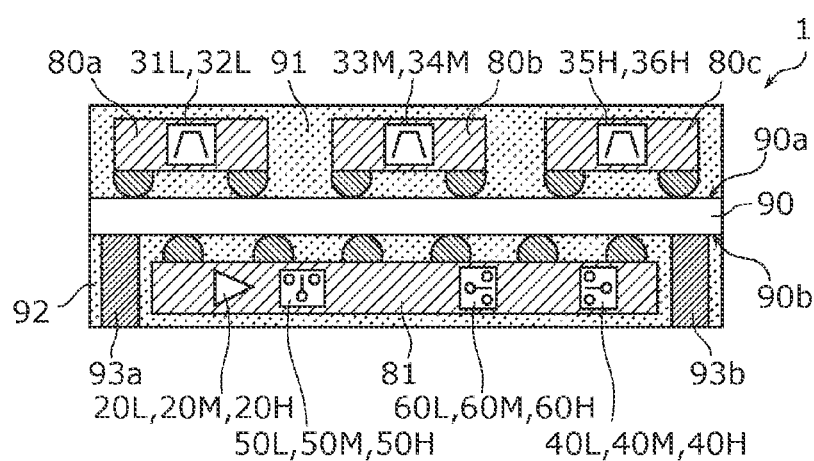
FIG. 2 is a sectional view schematically illustrating a structure of the radio-frequency module according to the embodiment.

FIG. 2 is a sectional view schematically illustrating a structure of the radio-frequency module 1 according to the present embodiment.

As illustrated in FIG. 2, the radio-frequency module 1 includes, in addition to the circuit configuration illustrated in FIG. 1, a module substrate 90 and resin members 91 and 92. The radio-frequency module 1 also includes three filter devices 80a to 80c, an integrated circuit (IC) device 81, and two conductive members 93a and 93b. The three filter devices 80a to 80c, the IC device 81, and the two conductive members 93a and 93b individually correspond to portions of the circuit configuration illustrated in FIG. 1.

The radio-frequency module 1 is mounted on an external substrate (not illustrated in the drawing). The external substrate is disposed on a major surface 90b side with respect to the module substrate 90. The radio-frequency module 1 is electrically coupled to the external substrate via the two conductive members 93a and 93b. The external substrate has, for example, the power amplifiers 5L, 5M, and 5H, the RFIC 3, the BBIC 4, and the antennas 2L, 2M, and 2H that are illustrated in FIG. 1.

The module substrate 90 is a mounting board having electronic components implementing the low-band circuit 1L, the middle-band circuit 1M, and the high-band circuit 1H. As the module substrate 90, for example, a low temperature co-fired ceramic (LTCC) substrate having a layered structure including a plurality of dielectric layers or a printed-circuit board is used.

As illustrated in FIG. 2, the module substrate 90 has a major surface 90a and a major surface 90b opposite to the major surface 90a. The major surface 90a is an example of a first major surface. The major surface 90b is an example of a second major surface. The major surface 90b is, for example, a surface (back surface) facing toward the external substrate (not illustrated in the drawing) having the radio-frequency module 1.

The resin member 91 covers electronic components mounted on the major surface 90a of the module substrate 90. Specifically, the resin member 91 covers the filter devices 80a to 80c and the major surface 90a. The resin member 91 fills spaces between the filter devices 80a to 80c and the major surface 90a. The resin member 91 makes the filter devices 80a to 80c reliable with respect to characteristics such as mechanical strength and moisture resistance.

The resin member 92 covers electronic components mounted on the major surface 90b of the module substrate 90. Specifically, the resin member 92 covers the IC device 81 and the major surface 90b. The resin member 92 fills spaces between the IC device 81 and the major surface 90b. The resin member 92 makes the IC device 81 reliable with respect to characteristics such as mechanical strength and moisture resistance.

It should be noted that the resin members 91 and 92 are optional constituent elements for the radio-frequency module according to the present disclosure. The radio-frequency module 1 does not necessarily include the resin members 91 and 92.

The two conductive members 93a and 93b are external connection terminals included in the radio-frequency module 1. Specifically, the two conductive members 93a and 93b individually serve as any of the antenna connection terminals 10L, 10M, and 10H, the transmit-signal input terminals 11L, 11M, and 11H, and the receive-signal output terminals 12L, 12M, and 12H. Although not illustrated in FIG. 2, the radio-frequency module 1 includes conductive members corresponding to, for example, the individual external connection terminals.

The conductive members 93a and 93b are columnar electrodes extended through the resin member 92. Alternatively, the conductive members 93a and 93b may be bump electrodes formed on the major surface 90b. When the conductive members 93a and 93b are bump electrodes, the resin member 92 is not necessarily included.

The elements included in the radio-frequency module 1 but not illustrated in FIG. 1 such as matching circuits and filters may be included in electronic components mounted on the major surface 90a or 90b or may be formed inside the module substrate 90.

The three filter devices 80a to 80c each includes at least the first filters, the second filters, or the third filters included in the radio-frequency module 1. Specifically, the filter device 80a includes the duplexers 31L and 32L of the low-band circuit 1L. The filter device 80b includes the duplexers 33M and 34M of the middle-band circuit 1M. The filter device 80c includes the duplexers 35H and 36H of the high-band circuit 1H.

The number of filter devices mounted on the major surface 90a, the number of duplexers included in each filter device, and the kind of duplexers included in each filter device are not limited to the example illustrated in FIG. 2. For example, six filter devices may be mounted on the major surface 90a, and the duplexers 31L, 32L, 33M, 34M, 35H, and 36H may be respectively included in the six filter devices. Furthermore, one filter device may include duplexers for different band groups.

The filter devices 80a to 80c are devices including, for example, SAW filters, and thus, it is difficult to form the filter devices 80a to 80c with low profile. In the radio-frequency module 1 according to the present embodiment, the filter devices 80a to 80c, which are difficult to be made with low profile, are disposed on only either the major surface 90a or 90b, and accordingly, the profile of the radio-frequency module 1 is lower than if the filter devices 80a to 80c are disposed on both the major surface 90a and 90b. Furthermore, because the IC device 81 is disposed on the major surface 90b, the area of the radio-frequency module 1 is smaller than if the IC device 81 is disposed on the same surface as the filter devices 80a to 80c. As such, the radio-frequency module 1 can be miniaturized.

The IC device 81 is an example of a semiconductor IC. The IC device 81 is mounted on the major surface 90b of the module substrate 90. The IC device 81 is implemented by, for example, a CMOS device. Specifically, the IC device 81 is formed by a silicon on insulator (SOI) process. As a result, the IC device 81 can be inexpensively manufactured. The IC device 81 may be formed by using at least gallium arsenide (GaAs), silicon germanium (SiGe), or gallium nitride (GaN). This enables output of radio-frequency signals with high amplification performance and low-noise performance.

The IC device 81 includes at least part of the low-band circuit 1L, part of the middle-band circuit 1M, and part of the high-band circuit 1H in the circuit configuration illustrated in FIG. 1. Specifically, the IC device 81 includes the circuit elements except the filters (duplexers) included in each of the low-band circuit 1L, the middle-band circuit 1M, and the high-band circuit 1H.

More specifically, the IC device 81 includes the low-noise amplifier 20L and the switches 40L, 50L, and 60L of the low-band circuit 1L. The IC device 81 also includes the low-noise amplifier 20M and the switches 40M, 50M, and 60M of the middle-band circuit 1M. The IC device 81 also includes the low-noise amplifier 20H and the switches 40H, 50H, and 60H of the high-band circuit 1H. In other words, the one IC device 81 includes the low-noise amplifiers 20L, 20M, and 20H, the switches 40L, 40M, and 40H, the switches 50L, 50M, and 50H, and the switches 60L, 60M, and 60H. It should be noted that an IC device or chip component different from the IC device 81 may include at least one of the low-noise amplifiers 20L, 20M, and 20H, the switches 40L, 40M, and 40H, the switches 50L, 50M, and 50H, and the switches 60L, 60M, and 60H.

Hereinafter, arrangements of the circuit elements in the IC device 81 will be described by using practical examples with reference to FIGS. 3A to 3D.

3-1. First Practical Example

Firstly, a first practical example will be described with reference to FIG. 3A.

Figure 3A:
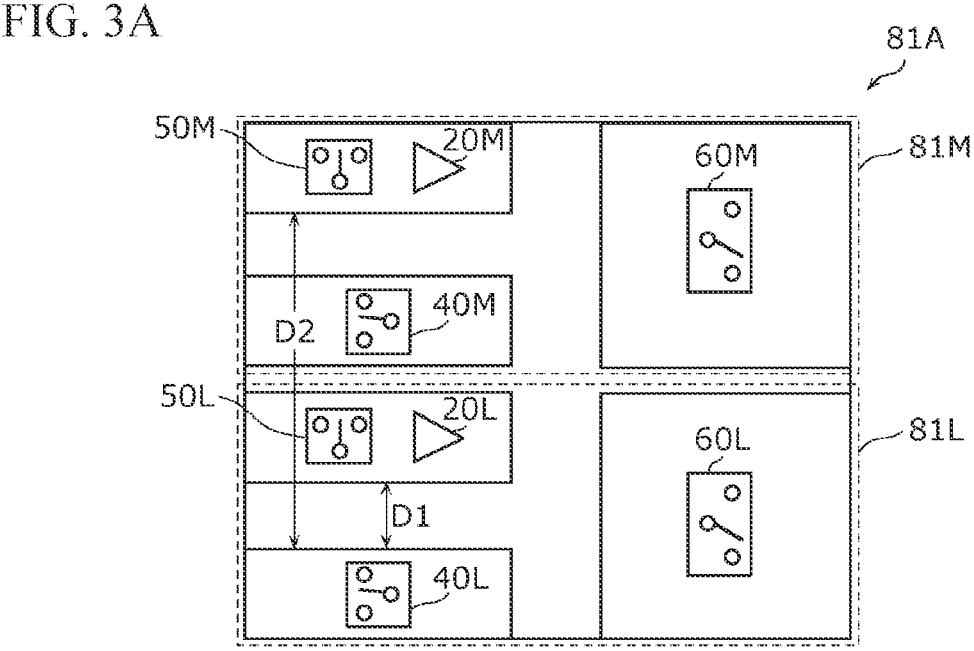
FIG. 3A is a plan view schematically illustrating a structure in an integrated circuit (IC) device of the radio-frequency module according to a first practical example.

FIG. 3A is a plan view schematically illustrating a structure in an IC device 81A of the radio-frequency module 1 according to the first practical example. Specifically, FIG. 3A schematically illustrates an arrangement of circuit elements in the IC device 81A when one surface of the IC device 81A is viewed in plan view. The one surface of the IC device 81A is in specific one surface of an SOI substrate. The one surface of the IC device 81A is parallel to the major surface 90b of the module substrate 90 of the radio-frequency module 1. Thus, when the one surface of the IC device 81A is viewed in plan view is almost the same as when the major surface 90b of the radio-frequency module 1 is viewed in plan view. The same holds for second to fourth practical examples described later.

The first practical example indicates an example of an arrangement of circuit elements in the IC device 81A when the IC device 81A does not include the circuit elements included in the high-band circuit 1H but include the circuit elements included in the low-band circuit 1L or the middle-band circuit 1M. The first practical example corresponds to, for example, the case in which the high-band circuit 1H is included in an electronic component other than the IC device 81. The first practical example also corresponds to the case in which the radio-frequency module 1 includes the low-band circuit 1L and the middle-band circuit 1M but excludes the high-band circuit 1H.

In the IC device 81A according to the first practical example, sections for arranging circuit elements are provided for the respective communication band groups. Specifically, as illustrated in FIG. 3A, the IC device 81A is divided into a low-band section 81L and a middle-band section 81M. For example, the low-band section 81L and the middle-band section 81M are identical to each other with respect to size and shape.

The low-band section 81L is an example of a first section for arranging the first transmit switch, the first low-noise amplifier, and the first antenna switch. Specifically, the low-band section 81L includes circuit elements included in the low-band circuit 1L. More specifically, as illustrated in FIG. 3A, the low-noise amplifier 20L and the switches 40L, 50L, and 60L are disposed in the low-band section 81L. The circuit elements are spaced apart from each other by relatively large distances in the low-band section 81L. In this structure, the circuit elements are grouped under signal types for processing, and circuit elements in the same group are disposed together. Specifically, circuit elements for one signal type for processing are spaced apart from each other by a distance shorter than the distance to circuit elements for another signal type for processing.

In this practical example, the low-noise amplifier 20L and the switch 50L both process receive signals. The switch 40L processes transmit signals. The switch 60L processes receive signals and transmit signals. As a result, the low-noise amplifier 20L and the switch 50L are disposed together apart from both the switches 40L and 60L. Specifically, the distance between the low-noise amplifier 20L and the switch 50L is shorter than both the distance between the low-noise amplifier 20L and the switch 40L and the distance between the low-noise amplifier 20L and the switch 60L. Similarly, the distance between the low-noise amplifier 20L and the switch 50L is shorter than both the distance between the switches 50L and 40L and the distance between the switches 50L and 60L.

The middle-band section 81M is an example of a second section for arranging the second transmit switch, the second low-noise amplifier, and the second antenna switch. Specifically, the middle-band section 81M includes circuit elements included in the middle-band circuit 1M. More specifically, as illustrated in FIG. 3A, the low-noise amplifier 20M and the switches 40M, 50M, and 60M are disposed in the middle-band section 81M. The circuit elements are spaced apart from each other by relatively large distances in the middle-band section 81M. In this structure, the circuit elements are grouped under signal types for processing, and circuit elements in the same group are disposed together. Specifically, circuit elements for one signal type for processing are spaced apart from each other by a distance shorter than the distance to circuit elements for another signal type for processing.

In the present embodiment, the low-noise amplifier 20M and the switch 50M both process receive signals. The switch 40M processes transmit signals. The switch 60M processes receive signals and transmit signals. As a result, the low-noise amplifier 20M and the switch 50M are disposed together apart from both the switches 40M and 60M. Specifically, the distance between the low-noise amplifier 20M and the switch 50M is shorter than both the distance between the low-noise amplifier 20M and the switch 40M and the distance between the low-noise amplifier 20M and the switch 60M. Similarly, the distance between the low-noise amplifier 20M and the switch 50M is shorter than both the distance between the switches 50M and 40M and the distance between the switches 50M and 60M.

In this practical example, the switch 40L, which processes transmit signals in the low-band circuit 1L, is disposed apart from the middle-band circuit 1M in the IC device 81A. Specifically, the switch 40L is disposed apart from circuit elements for processing receive signals in the middle-band circuit 1M. For example, as illustrated in FIG. 3A, a distance D2 between the transmit switch 40L of the low-band circuit 1L and the low-noise amplifier 20M of the middle-band circuit 1M is longer than a distance D1 between the switch 40L and the low-noise amplifier 20L of the low-band circuit 1L. Similarly, the distance between the switch 40L and the receive switch 50M of the middle-band circuit 1M is longer than the distance D1 between the switch 40L and the receive switch 50L of the low-band circuit 1L.

By disposing the switch 40L for processing transmit signals in the low-band circuit 1L apart from the low-noise amplifier 20M and the switch 50M for processing receive signals in the middle-band circuit 1M, isolation between the switch 40L, and the low-noise amplifier 20M and the switch 50M is provided in the radio-frequency module 1. Consequently, it is possible to reduce effects of transmit signals in the low-band group on receive signals in the middle-band group and thus suppress the degradation of receiving accuracy.

In this practical example, a power-supply wire or ground wire is disposed between the circuit elements. The power-supply wire or ground wire is, for example, conductive pattern wires formed at a surface of the SOI substrate of the IC device 81A.

For example, in the low-band section 81L, a power-supply wire or ground wire is disposed between the switch 40L, and the low-noise amplifier 20L and the switch 50L, and between the switch 60L, and the switch 40L, the low-noise amplifier 20L, and the switch 50L. In the middle-band section 81M, a power-supply wire or ground wire is disposed between the switch 40M, and the low-noise amplifier 20M and the switch 50M, and between the switch 60M, and the switch 40M, the low-noise amplifier 20M, and the switch 50M. This structure can enhance isolation between the circuit elements.

When the IC device 81A includes the high-band circuit 1H instead of the middle-band circuit 1M, the same arrangement as the example illustrated in FIG. 3A is used. Specifically, instead of the low-noise amplifier 20M and the switches 40M, 50M, and 60M of the middle-band circuit 1M, the low-noise amplifier 20H and the switches 40H, 50H, and 60H of the high-band circuit 1H are arranged.

3-2. Second Practical Example

Next, the second practical example will be described with reference to FIG. 3B.

Figure 3B:
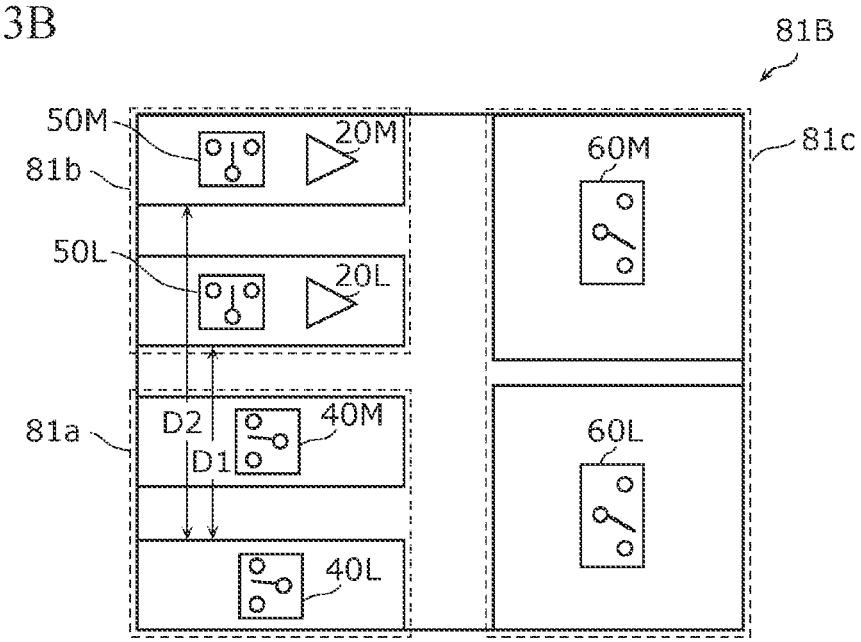
FIG. 3B is a plan view schematically illustrating a structure in an IC device of the radio-frequency module according to a second practical example.

FIG. 3B is a plan view schematically illustrating a structure in an IC device 81B of the radio-frequency module 1 according to the second practical example.

Similarly to the first practical example, the second practical example indicates an example of an arrangement of circuit elements in the IC device 81B when the IC device 81B does not include the circuit elements included in the high-band circuit 1H but include the circuit elements included in the low-band circuit 1L or the middle-band circuit 1M.

The IC device 81B according to the second practical example has sections for arranging circuit elements in association with individual functions (specifically, signal types for processing) of circuit elements. Specifically, as illustrated in FIG. 3B, the IC device 81B is divided into a transmit-switch section 81a, a LNA section 81b, and an antenna-switch section 81c. For example, the transmit-switch section 81a and the LNA section 81b are identical to each other with respect to size and shape. The size of the antenna-switch section 81c is, for example, the total size of the transmit-switch section 81a and the LNA section 81b. The size and shape of each section is not limited to any particular size and shape.

The transmit-switch section 81a is an example of the first section for arranging the first transmit switch and the second transmit switch. Specifically, as illustrated in FIG. 3B, in the transmit-switch section 81a, the switch 40L of the low-band circuit 1L and the switch 40M of the middle-band circuit 1M are disposed. The switches are spaced apart from each other by a relatively large distance in the transmit-switch section 81a.

The LNA section 81b is an example of the second section for arranging the first low-noise amplifier and the second low-noise amplifier. In the LNA section 81b, the first receive switch and the second receive switch are also disposed. Specifically, as illustrated in FIG. 3B, in the LNA section 81b, the low-noise amplifiers 20L and 20M and the switches 50L and 50M are disposed. The circuit elements are spaced apart from each other by relatively large distances in the LNA section 81b. In this structure, the circuit elements are grouped under band groups, and circuit elements in the same band group are disposed together. Specifically, circuit elements for one band group are spaced apart from each other by a distance shorter than the distance to circuit elements for another band group.

In the present embodiment, the low-noise amplifier 20L and the switch 50L are both circuit elements included in the low-band group. The low-noise amplifier 20M and the switch 50M are both circuit elements included in the middle-band group. As a result, the low-noise amplifier 20L and the switch 50L are disposed together apart from both the low-noise amplifier 20M and the switch 50M. Similarly, the low-noise amplifier 20M and the switch 50M are disposed together apart from both the low-noise amplifier 20L and the switch 50L. Specifically, the distance between the low-noise amplifier 20L and the switch 50L is shorter than both the distance between the low-noise amplifiers 20L and 20M and the distance between the low-noise amplifier 20L and the switch 50M. Similarly, the distance between the low-noise amplifier 20L and the switch 50L is shorter than both the distance between the switch 50L and the low-noise amplifier 20M and the distance between the switches 50L and 50M.

The antenna-switch section 81c is an example of a third section for arranging the first antenna switch and the second antenna switch. Specifically, as illustrated in FIG. 3B, in the antenna-switch section 81c, the switch 60L of the low-band circuit 1L and the switch 60M of the middle-band circuit 1M are disposed. The switches are spaced apart from each other by a relatively large distance in the antenna-switch section 81c.

Similarly to the first practical example, in this practical example, the switch 40L, which processes transmit signals in the low-band circuit 1L, is disposed apart from circuit elements for processing receive signals in the middle-band circuit 1M in the IC device 81B. For example, as illustrated in FIG. 3B, the distance D2 between the transmit switch 40L of the low-band circuit 1L and the low-noise amplifier 20M of the middle-band circuit 1M is longer than the distance D1 between the switch 40L and the low-noise amplifier 20L of the low-band circuit 1L. Similarly, the distance between the switch 40L and the receive switch 50M of the middle-band circuit 1M is longer than the distance D1 between the switch 40L and the receive switch 50L of the low-band circuit 1L. Consequently, similarly to the first practical example, it is possible to reduce effects of transmit signals in the low-band group on receive signals in the middle-band group and thus suppress the degradation of receiving accuracy.

In this practical example, a power-supply wire or ground wire is disposed between the circuit elements. For example, a power-supply wire or ground wire is disposed between the transmit-switch section 81a and the LNA section 81b. A power-supply wire or ground wire is disposed between the transmit-switch section 81a and the LNA section 81b, and the antenna-switch section 81c. In the transmit-switch section 81a, a power-supply wire or ground wire is disposed between the switches 40L and 40M. In the LNA section 81b, a power-supply wire or ground wire is disposed between the low-noise amplifier 20L and the switch 50L, and the low-noise amplifier 20M and the switch 50M. This structure can enhance isolation between the circuit elements.

When the IC device 81B includes the high-band circuit 1H instead of the middle-band circuit 1M, the same arrangement as the example illustrated in FIG. 3B is used. Specifically, instead of the low-noise amplifier 20M and the switches 40M, 50M, and 60M of the middle-band circuit 1M, the low-noise amplifier 20H and the switches 40H, 50H, and 60H of the high-band circuit 1H are arranged.

3-3. Third Practical Example

Next, the third practical example will be described with reference to FIG. 3C.

Figure 3C:
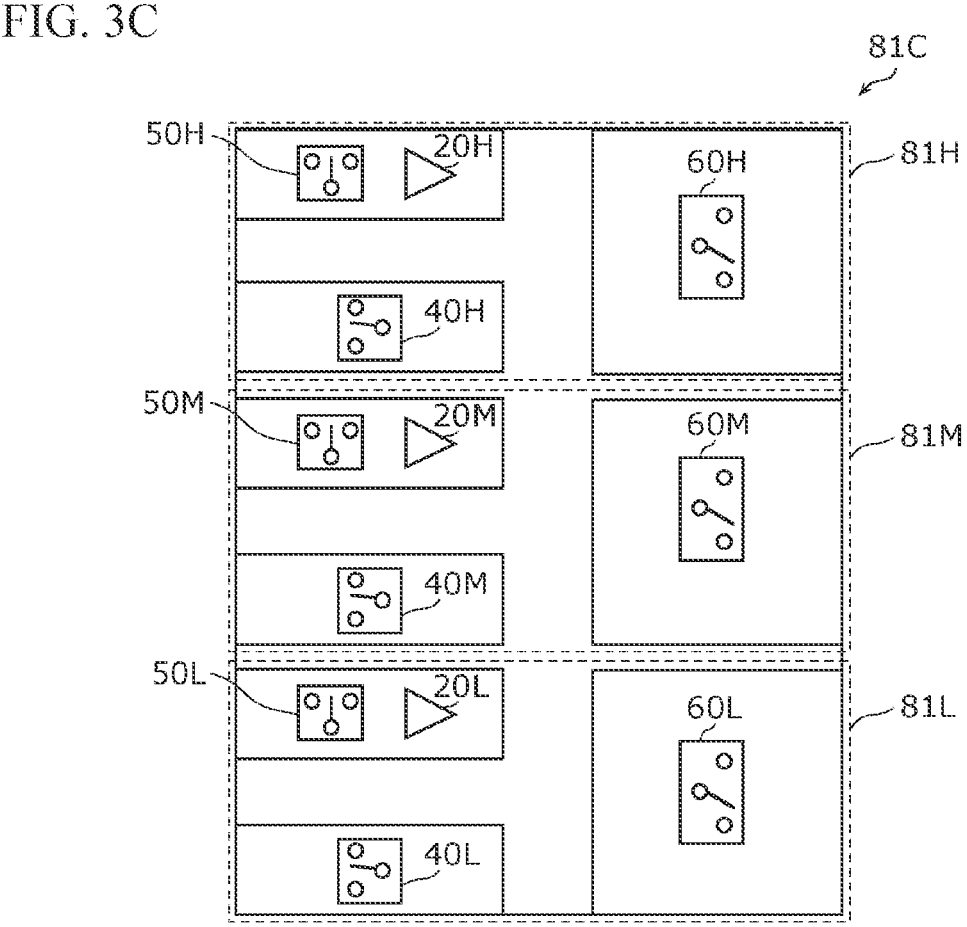
FIG. 3C is a plan view schematically illustrating a structure in an IC device of the radio-frequency module according to a third practical example.

FIG. 3C is a plan view schematically illustrating a structure in an IC device 81C of the radio-frequency module 1 according to the third practical example.

The third practical example indicates an example of an arrangement of circuit elements in the IC device 81C when the IC device 81C includes circuit elements included in the low-band circuit 1L, the middle-band circuit 1M, and the high-band circuit 1H.

In the IC device 81C according to the third practical example, sections for arranging circuit elements are provided for the respective communication band groups. Specifically, as illustrated in FIG. 3C, the IC device 81C is divided into the low-band section 81L, the middle-band section 81M, and a high-band section 81H. The middle-band section 81M is positioned between the low-band section 81L and the high-band section 81H. For example, the low-band section 81L, the middle-band section 81M, and the high-band section 81H are identical to each other with respect to size and shape.

The low-band section 81L and the middle-band section 81M are the same as in the first practical example.

The high-band section 81H is an example of the third section for arranging the third transmit switch, the third low-noise amplifier, and the third antenna switch. Specifically, the high-band section 81H includes circuit elements included in the high-band circuit 1H. More specifically, as illustrated in FIG. 3C, the low-noise amplifier 20H and the switches 40H, 50H, and 60H are disposed in the high-band section 81H. The circuit elements are spaced apart from each other by relatively large distances in the high-band section 81H. In this structure, the circuit elements are grouped under signal types for processing, and circuit elements in the same group are disposed together. Specifically, circuit elements for one signal type for processing are spaced apart from each other by a distance shorter than the distance to circuit elements for another signal type for processing.

In this practical example, the low-noise amplifier 20H and the switch 50H both process receive signals. The switch 40H processes transmit signals. The switch 60H processes receive signals and transmit signals. As a result, the low-noise amplifier 20H and the switch 50H are disposed together apart from both the switches 40H and 60H. Specifically, the distance between the low-noise amplifier 20H and the switch 50H is shorter than both the distance between the low-noise amplifier 20H and the switch 40H and the distance between the low-noise amplifier 20H and the switch 60H. Similarly, the distance between the low-noise amplifier 20H and the switch 50H is shorter than both the distance between the switches 50H and 40H and the distance between the switches 50H and 60H.

In this practical example, the switch 40L, which processes transmit signals in the low-band circuit 1L, is disposed apart from the middle-band circuit 1M and the high-band circuit 1H in the IC device 81C. Specifically, the switch 40L is disposed apart from circuit elements for processing receive signals in the middle-band circuit 1M and circuit elements for processing receive signals in the high-band circuit 1H. For example, the distance between the transmit switch 40L of the low-band circuit 1L and the low-noise amplifier 20M or the switch 50M of the middle-band circuit 1M is longer than the distance between the switch 40L and the low-noise amplifier 20L of the low-band circuit 1L. The distance between the switch 40L and the low-noise amplifier 20H or the switch 50H of the high-band circuit 1H is longer than the distance between the switch 40L and the low-noise amplifier 20L.

By disposing the switch 40L for processing transmit signals in the low-band circuit 1L apart from the low-noise amplifier 20H and the switch 50H for processing receive signals in the high-band circuit 1H, isolation between the switch 40L, and the low-noise amplifier 20H and the switch 50H is provided in the radio-frequency module 1. Consequently, it is possible to reduce effects of transmit signals in the low-band group on receive signals in the high-band group and thus suppress the degradation of receiving accuracy.

The position of the middle-band section 81M and the position of the high-band section 81H may be switched. This means that the high-band section 81H may be positioned between the low-band section 81L and the middle-band section 81M. Alternatively, the low-band section 81L may be positioned between the middle-band section 81M and the high-band section 81H.

In this practical example, a power-supply wire or ground wire is disposed between the circuit elements. For example, in the high-band section 81H, a power-supply wire or ground wire is disposed between the switch 40H, and the low-noise amplifier 20H and the switch 50H, and between the switch 60H, and the switch 40H, the low-noise amplifier 20H, and the switch 50H. This structure can enhance isolation between the circuit elements.

3-4. Fourth Practical Example

Next, the fourth practical example will be described with reference to FIG. 3D.

Figure 3D:
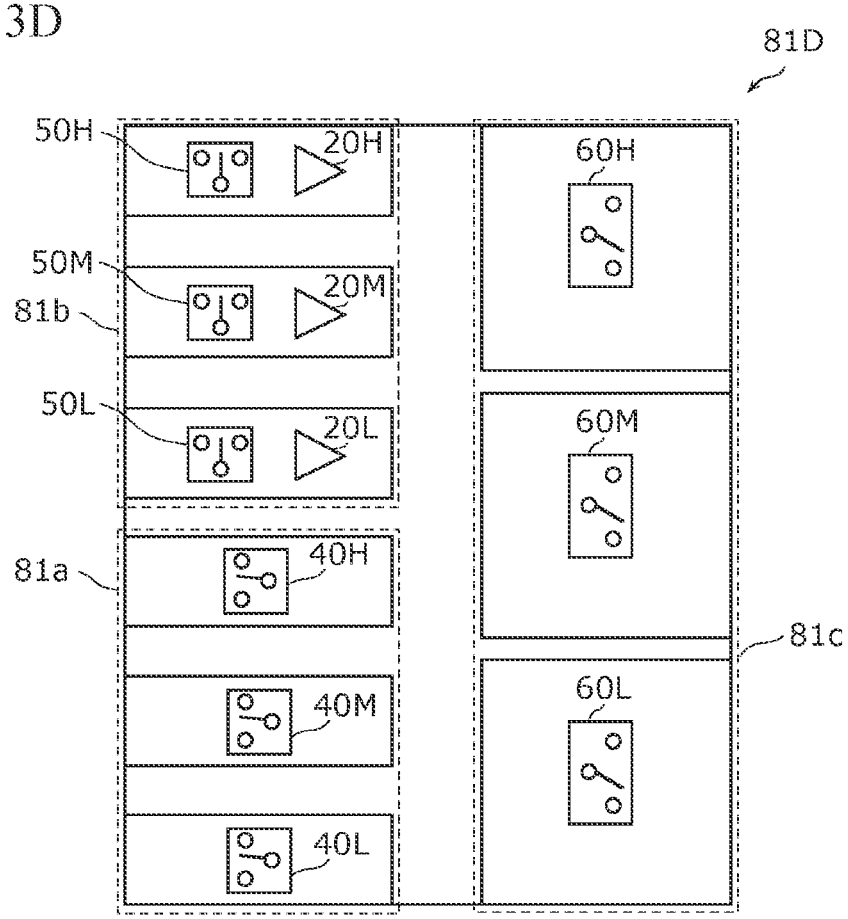
FIG. 3D is a plan view schematically illustrating a structure in an IC device of the radio-frequency module according to a fourth practical example.

FIG. 3D is a plan view schematically illustrating a structure in an IC device 81D of the radio-frequency module 1 according to the fourth practical example.

Similarly to the third practical example, the fourth practical example indicates an example of an arrangement of circuit elements in the IC device 81D when the IC device 81D includes circuit elements included in the low-band circuit 1L, the middle-band circuit 1M, and the high-band circuit 1H.

The IC device 81C according to the fourth practical example has sections for arranging circuit elements in association with individual functions (specifically, signal types for processing) of circuit elements. Specifically, as illustrated in FIG. 3D, the IC device 81D is divided into the transmit-switch section 81a, the LNA section 81b, and the antenna-switch section 81c. For example, the transmit-switch section 81a and the LNA section 81b are identical to each other with respect to size and shape. The size of the antenna-switch section 81c is, for example, the total size of the transmit-switch section 81a and the LNA section 81b. The size and shape of each section is not limited to any particular size and shape.

The transmit-switch section 81a is an example of the first section for arranging the first transmit switch, the second transmit switch, and the third transmit switch. Specifically, as illustrated in FIG. 3D, in the transmit-switch section 81a, the switch 40L of the low-band circuit 1L, the switch 40M of the middle-band circuit 1M, and the switch 40H of the high-band circuit 1H are disposed. The switches are spaced apart from each other by relatively large distances in the transmit-switch section 81a.

The switch 40M is positioned between the switches 40L and 40H in the example illustrated in FIG. 3D, but the position of each switch is not limited to this example. The switch 40H may be positioned between the switches 40L and 40M. Alternatively, the switch 40L may be positioned between the switches 40M and 40H. The switches 40L, 40M, and 40H are aligned in the longitudinal direction in the drawing, but the switches 40L, 40M, and 40H may be aligned in the lateral direction. This means that the direction in which the switches 40L, 40M, and 40H are aligned may be different from the direction in which the switches 60L, 60M, and 60H are aligned. The switches 40L, 40M, and 40H may be arranged in a circle.

The LNA section 81b is an example of the second section for arranging the first low-noise amplifier, the second low-noise amplifier, and the third low-noise amplifier. In the LNA section 81b, the first receive switch, the second receive switch, and the third receive switch are also disposed. Specifically, as illustrated in FIG. 3D, in the LNA section 81b, the low-noise amplifiers 20L, 20M, and 20H and the switches 50L, 50M, and 50H are disposed. Similarly to the second practical example, the circuit elements are spaced apart from each other by relatively large distances in the LNA section 81b; the circuit elements are grouped under band groups, and circuit elements in the same band group are disposed together other in the LNA section 81b. Specifically, circuit elements for one band group are spaced apart from each other by a distance shorter than the distance to circuit elements for another band group.

In the present embodiment, the low-noise amplifier 20L and the switch 50L are disposed together apart from both the low-noise amplifier 20M and the switch 50M and the low-noise amplifier 20H and the switch 50H. Similarly, the low-noise amplifier 20M and the switch 50M are disposed together apart from both the low-noise amplifier 20L and the switch 50L and the low-noise amplifier 20H and the switch 50H. The low-noise amplifier 20H and the switch 50H are disposed together apart from both the low-noise amplifier 20L and the switch 50L and the low-noise amplifier 20M and the switch 50M. For example, the distance between the low-noise amplifier 20H and the switch 50H is shorter than both the distance between the low-noise amplifier 20H and the low-noise amplifier 20L or 20M and the distance between the low-noise amplifier 20H and the switch 50L or 50M. The distance between the low-noise amplifier 20H and the switch 50H is shorter than both the distance between the switch 50H and the low-noise amplifier 20L or 20M and the distance between the switch 50H and the switch 50L or 50M.

The low-noise amplifier 20M and the switch 50M are positioned between the low-noise amplifier 20L and the switch 50L, and the low-noise amplifier 20H and the switch 50H in the example illustrated in FIG. 3D, but the position of each element is not limited to this example. The low-noise amplifier 20H and the switch 50H may be positioned between the low-noise amplifier 20L and the switch 50L, and the low-noise amplifier 20M and the switch 50M. Alternatively, the low-noise amplifier 20L and the switch 50L may be positioned between the low-noise amplifier 20M and the switch 50M, and the low-noise amplifier 20H and the switch 50H. The circuit elements (low-noise amplifiers and switches) are aligned in the longitudinal direction in the drawing, but the circuit elements may be aligned in the lateral direction. This means that the direction in which the elements are aligned may be different from the direction in which the switches 40L, 40M, and 40H are aligned. The circuit elements may be arranged in a circle.

The antenna-switch section 81c is an example of the third section for arranging the first antenna switch, the second antenna switch, and the third antenna switch. Specifically, as illustrated in FIG. 3D, in the antenna-switch section 81c, the switch 60L of the low-band circuit 1L, the switch 60M of the middle-band circuit 1M, and the switch 60H of the high-band circuit 1H are disposed. The switches are spaced apart from each other by a relatively large distance in the antenna-switch section 81c.

The switch 60M is positioned between the switches 60L and 60H in the example illustrated in FIG. 3D, but the position of each switch is not limited to this example. The switch 60H may be positioned between the switches 60L and 60M. Alternatively, the switch 60L may be positioned between the switches 60M and 60H. The switches 60L, 60M, and 60H are aligned in the longitudinal direction in the drawing, but the switches 60L, 60M, and 60H may be aligned in the lateral direction. The switches 60L, 60M and 60H may be arranged in a circle.

Similarly to the first to third practical examples, in this practical example, the switch 40L, which processes transmit signals in the low-band circuit 1L, is disposed apart from circuit elements for processing receive signals in the middle-band circuit 1M and circuit elements for processing receive signals in the high-band circuit 1H in the IC device 81D. For example, the distance between the transmit switch 40L of the low-band circuit 1L and the low-noise amplifier 20M or the switch 50M of the middle-band circuit 1M is longer than the distance between the switch 40L and the low-noise amplifier 20L of the low-band circuit 1L. The distance between the switch 40L and the low-noise amplifier 20H or the switch 50H of the high-band circuit 1H is longer than the distance between the switch 40L and the low-noise amplifier 20L.

By disposing the switch 40L for processing transmit signals in the low-band circuit 1L apart from the low-noise amplifier 20H and the switch 50H for processing receive signals in the high-band circuit 1H, isolation between the switch 40L, and the low-noise amplifier 20H and the switch 50H is provided in the radio-frequency module 1. Consequently, it is possible to reduce effects of transmit signals in the low-band group on receive signals in the high-band group and thus suppress the degradation of receiving accuracy.

In this practical example, similarly to the second practical example, a power-supply wire or ground wire is disposed between the circuit elements. This structure can enhance isolation between the circuit elements.

3-5. Others

As described above, the first to fourth practical examples explain the plan layouts of the circuit elements in the IC devices 81A to 81D, but the same arrangement as any of the first to fourth practical examples may be used when at least one of the circuit elements is not included in the one IC device 81.

For example, in the first practical example, the low-noise amplifier 20L and the switches 40L, 50L, and 60L in the low-band section 81L may be included in one semiconductor IC (first IC), and the low-noise amplifier 20M and the switches 40M, 50M, and 60M in the middle-band section 81M may be included in another semiconductor IC (second IC). The semiconductor ICs (first IC and second IC) of the respective sections may be mounted on the major surface 90b of the module substrate 90. Additionally, the low-noise amplifier 20H and the switches 40H, 50H, and 60H in the high-band section 81H in the third practical example may be included in another semiconductor IC (third IC).

In the second practical example, the switches 40L and 40M in the transmit-switch section 81a may be included in one semiconductor IC (first IC), the low-noise amplifiers 20L and 20M and the switches 50L and 50M in the LNA section 81b may be included in another semiconductor IC (second IC), and the switches 60L and 60M in the antenna-switch section 81c may be included in another semiconductor IC (third IC). Similarly, in the fourth practical example, the circuit elements in the individual sections may be included in different semiconductor ICs.

4. Effects

As described above, the radio-frequency module 1 according to the present embodiment includes the low-band circuit 1L configured to transfer the first transmit-signal group and the first receive-signal group in the low-band group composed of the first communication bands that include different frequency bands, the middle-band circuit 1M configured to transfer the second transmit-signal group and the second receive-signal group in the middle-band group composed of the second communication bands that are higher than the frequency bands of the first communication bands and that include different frequency bands, one or more antenna connection terminals of the antenna connection terminals 10L and 10M, the transmit-signal input terminal 11L coupled to the output terminal of the power amplifier 5L configured to amplify the first transmit-signal group, and the transmit-signal input terminal 11M coupled to the output terminal of the power amplifier 5M configured to amplify the second transmit-signal group. The low-band circuit 1L includes the first filters (specifically, the duplexers 31L and 32L) having pass bands corresponding to the respective first communication bands, the switch 60L configured to control connection and disconnection between the antenna connection terminal 10L and the individual duplexers 31L and 32L, and the transmit switch 40L configured to control connection and disconnection between the transmit-signal input terminal 11L and the duplexers 31L and 32L. The middle-band circuit 1M includes the second filters (specifically, the duplexers 33M and 34M) having pass bands corresponding to the respective second communication bands, the switch 60M configured to control connection and disconnection between the antenna connection terminal 10M and the duplexers 33M and 34M, and the switch 40M configured to control connection and disconnection between the transmit-signal input terminal 11M and the duplexers 33M and 34M.

With this configuration, the radio-frequency module 1 includes the switches 40L and 40M, and as a result, it is possible to reduce external connection terminals included in the radio-frequency module 1. Consequently, the radio-frequency module 1 can be miniaturized. Moreover, because the radio-frequency module 1 does not include the power amplifiers 5L and 5M, transmit signals are less likely to enter into the receive circuit for processing receive signals in different communication bands. This means that it is possible to enhance isolation between transmit and receive sides. As such, the present embodiment can implement the miniaturized radio-frequency module 1 with improved isolation between transmit and receive sides.

Further, for example, at least one frequency band of the plurality of second communication bands may include an nth harmonic frequency of a frequency included in at least one of the plurality of first communication bands, where n is a natural number equal to or greater than 2.

With this configuration, when transmit signals are likely to affect receive signals, it is still possible to enhance isolation between transmit and receive sides, and thus, the degradation of receiving accuracy can be suppressed.

Furthermore, for example, the low-band circuit 1L may further include the low-noise amplifier 20L configured to amplify the first receive-signal group. The middle-band circuit 1M may further include the low-noise amplifier 20M configured to amplify the second receive-signal group.

With this configuration, the radio-frequency module 1 includes the low-noise amplifiers 20L and 20M, and as a result, the communication device 6 can be miniaturized.

Moreover, for example, the low-band circuit 1L may further include the receive switch 50L configured to control connection and disconnection between the individual duplexers 31L and 32L and the low-noise amplifier 20L. The middle-band circuit 1M may further include the receive switch 50M configured to control connection and disconnection between the individual duplexers 33M and 34M and the low-noise amplifier 20M.

With this configuration, it is possible to control connection and disconnection between the individual duplexers 31L and 32L and the low-noise amplifier 20L, and consequently, it is possible to reduce the likelihood that receive signals affect radio-frequency signals in different communication bands in the low-band circuit 1L. The same holds for the middle-band circuit 1M.

Further, for example, the transmit switch 40L may include a common terminal coupled to the transmit-signal input terminal 11L and a plurality of selection terminals corresponding to the duplexers 31L and 32L in one-to-one correspondence and coupled to the corresponding duplexers 31L and 32L. The antenna switch 60L may include a common terminal coupled to the antenna connection terminal 10L and a plurality of selection terminals corresponding to the duplexers 31L and 32L in one-to-one correspondence and coupled to the corresponding duplexers 31L and 32L. The receive switch 50L may include a common terminal coupled to the input terminal of the low-noise amplifier 20L and a plurality of selection terminals corresponding to the duplexers 31L and 32L in one-to-one correspondence and coupled to the corresponding duplexers 31L and 32L. The transmit switch 40M may include a common terminal coupled to the transmit-signal input terminal 11M and a plurality of selection terminals corresponding to the duplexers 33M and 34M in one-to-one correspondence and coupled to the corresponding duplexers 33M and 34M. The antenna switch 60M may include a common terminal coupled to the antenna connection terminal 10M and a plurality of selection terminals corresponding to the duplexers 33M and 34M in one-to-one correspondence and coupled to the corresponding duplexers 33M and 34M. The receive switch 50M may include a common terminal coupled to the input terminal of the low-noise amplifier 20M and a plurality of selection terminals corresponding to the duplexers 33M and 34M in one-to-one correspondence and coupled to the corresponding duplexers 33M and 34M.

Furthermore, for example, the radio-frequency module 1 may further include the module substrate 90 having the major surface 90a and the major surface 90b opposite to the major surface 90a. At least either the duplexers 31L and 32L or the duplexers 33M and 34M may be mounted on the major surface 90a. The low-noise amplifiers 20L and 20M may be mounted on the major surface 90b.

With this configuration, circuit elements are disposed on both surfaces of the module substrate 90, and thus, it is possible to reduce the area of the module substrate 90.

Moreover, for example, the transmit switches 40L and 40M may be mounted on the major surface 90b.

With this configuration, it is possible to dispose on the major surface 90b of the module substrate 90 the circuit elements that can be made with low profile, and as a result, the radio-frequency module 1 can be made with low profile.

Further, for example, the low-noise amplifiers 20L and 20M and the transmit switches 40L and 40M may be included in the one IC device 81.

With this configuration, it is possible to form as one chip the low-noise amplifiers 20L and 20M and the transmit switches 40L and 40M, and thus, the radio-frequency module 1 can be miniaturized.

Furthermore, for example, when one surface of the IC device 81 is viewed in plan view, the one surface may be divided into at least the transmit-switch section 81a, the LNA section 81b, and the antenna-switch section 81c. The transmit switches 40L and 40M may be disposed in the transmit-switch section 81a. The low-noise amplifiers 20L and 20M may be disposed in the LNA section 81b. The switches 60L and 60M may be disposed in the antenna-switch section 81c.

With this configuration, the circuit elements can be disposed in different sections in accordance with the type of circuit element, and thus, it is possible to reduce the likelihood of magnetic-field coupling between the circuit elements for processing transmit signals and the circuit elements for processing receive signals. Consequently, it is possible to enhance isolation between transmit and receive sides.

Moreover, for example, when one surface of the IC device 81 is viewed in plan view, the one surface may be divided into at least the low-band section 81L and the middle-band section 81M. The transmit switch 40L, the low-noise amplifier 20L, and the switch 60L may be disposed in the low-band section 81L. The transmit switch 40M, the low-noise amplifier 20M, and the switch 60M may be disposed in the middle-band section 81M.

With this configuration, the circuit elements can be disposed in different sections in accordance with the communication band group, and thus, it is possible to reduce the likelihood of magnetic-field coupling between the circuit elements for different communication bands.

Further, for example, a power-supply wire or ground wire may be disposed between the low-band section 81L and the middle-band section 81M.

With this configuration, a power-supply wire or ground wire is disposed between circuit elements, it is possible to reduce the likelihood of magnetic-field coupling between the circuit elements. As a result, the likelihood of magnetic-field coupling between, for example, the transmit switch 40L for the low-band group and the low-noise amplifier 20M for the middle-band group can be reduced, and thus, it is possible to enhance isolation between transmit and receive sides.

Furthermore, for example, the distance between the transmit switch 40L and the low-noise amplifier 20M is longer than the distance between the transmit switch 40L and the low-noise amplifier 20L.

With this configuration, it is possible to reduce the likelihood of magnetic-field coupling between the transmit switch 40L for the low-band group and the low-noise amplifier 20M for the middle-band group. Because the isolation between transmit and receive sides is enhanced, it is possible to suppress the degradation of receiving accuracy.

Moreover, for example, the first filters and the second filters may be all duplexers.

With this configuration, it is possible to easily distribute with high precision transmit signals and receive signals in the low-band group and transmit signals and receive signals in the middle-band group.

Further, for example, the radio-frequency module 1 may include the high-band circuit 1H configured to transfer the third transmit-signal group and the third receive-signal group in the high-band group composed of the third communication bands that are higher than the frequency bands of the second communication bands and that include different frequency bands, and the transmit-signal input terminal 11H coupled to the output terminal of the power amplifier 5H configured to amplify the third transmit-signal group. The high-band circuit 1H may include the third filters (specifically, the duplexers 35H and 36H) having pass bands corresponding to the respective third communication bands, the switch 60H configured to control connection and disconnection between the antenna connection terminal 10H and the individual duplexers 35H and 36H, and the transmit switch 40H configured to control connection and disconnection between the transmit-signal input terminal 11H and the duplexers 35H and 36H.

With this configuration, the single radio-frequency module 1 can implement three communication circuits for transferring radio-frequency signals in three band groups. Consequently, the communication device 6 can be miniaturized.

Furthermore, for example, the high-band circuit 1H may further include the low-noise amplifier 20H configured to amplify the third receive-signal group.

With this configuration, the radio-frequency module 1 includes the low-noise amplifier 20H, and as a result, the communication device 6 can be further miniaturized.

Moreover, for example, the high-band circuit 1H may further include the receive switch 50H configured to control connection and disconnection between the individual duplexers 35H and 36H and the low-noise amplifier 20H.

With this configuration, it is possible to control connection and disconnection between the individual duplexers 35H and 36H and the low-noise amplifier 20H, and consequently, it is possible to reduce the likelihood that receive signals affect radio-frequency signals in different communication bands in the high-band circuit 1H.

Further, for example, the transmit switch 40H may include a common terminal coupled to the transmit-signal input terminal 11H and a plurality of selection terminals corresponding to the duplexers 35H and 36H in one-to-one correspondence and coupled to the corresponding duplexers 35H and 36H. The antenna switch 60H may include a common terminal coupled to the antenna connection terminal 10H and a plurality of selection terminals corresponding to the duplexers 35H and 36H in one-to-one correspondence and coupled to the corresponding duplexers 35H and 36H. The receive switch 50H may include a common terminal coupled to the input terminal of the low-noise amplifier 20H and a plurality of selection terminals corresponding to the duplexers 35H and 36H in one-to-one correspondence and coupled to the corresponding duplexers 35H and 36H.

Furthermore, for example, the third filters may be all duplexers.

With this configuration, it is possible to easily distribute with high precision transmit signals and receive signals in the high-band group.

Moreover, for example, the communication device 6 according to the present embodiment includes the radio-frequency module 1 and the RFIC 3 configured to process radio-frequency signals received or to be transmitted by the antenna 2L, 2M or 2H. The radio-frequency module 1 transfers a radio-frequency signal between the antenna 2L, 2M or 2H and the RFIC 3.

This configuration yields the miniaturized communication device 6 with enhanced isolation between transmit and receive sides.

5. Modifications

The following provides descriptions of modifications of the embodiment. The following descriptions mainly focus on differences from the embodiment described above and omits or simplifies descriptions about common points.

5-1. First Modification

Firstly, a first modification will be described.

The first modification differs from the embodiment in the position of the transmit switch on the module substrate. Specifically, in a radio-frequency module according to the first modification, the filter (specifically, duplexer) and the transmit switch are mounted on the same surface. The circuit configuration of the radio-frequency module according to this modification is identical to the circuit configuration illustrated in FIG. 1.

Figure 4:
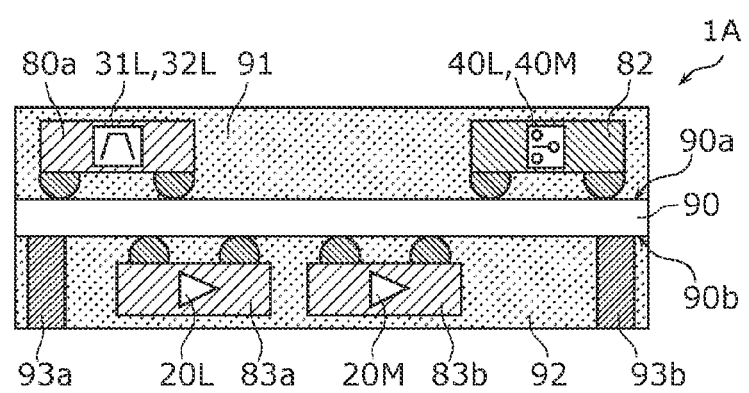
FIG. 4 is a sectional view schematically illustrating a structure of a radio-frequency module according to a first modification of the embodiment.

FIG. 4 is a sectional view schematically illustrating a structure of a radio-frequency module 1A according to this modification. As illustrated in FIG. 4, the filter device 80a including the duplexers 31L and 32L and a switch IC 82 including the transmit switches 40L and 40M are mounted on the major surface 90a of the radio-frequency module 1A. An IC device 83a including the low-noise amplifier 20L and an IC device 83b including the low-noise amplifier 20M are mounted on the major surface 90b.

FIG. 4 illustrates not all the circuit elements included in the radio-frequency module 1A. For example, although not illustrated in FIG. 4, the filter device 80b including the duplexers 33M and 34M and the filter device 80c including the duplexers 35H and 36H are mounted on the major surface 90a, and one or more IC devices including the low-noise amplifier 20H and the switches 50L, 50M, and 50H are mounted on the major surface 90b.

In this modification, when the major surface 90a is viewed in plan view, the transmit switches 40L and 40M do not overlap both the low-noise amplifiers 20L and 20M. This means that, as illustrated in FIG. 4, with respect to a section plane perpendicular to the major surface 90a, the position of the transmit switches 40L and 40M is different from the position of the low-noise amplifier 20L and the position of the low-noise amplifier 20M in a direction (lateral direction in the diagram) parallel to the major surface 90a.

Although not illustrated in FIG. 4, the transmit switches 40L and 40M do not overlap the low-noise amplifier 20H of the high-band circuit 1H in plan view. The switch 40H of the high-band circuit 1H does not overlap any of the low-noise amplifiers 20L, 20M, and 20H. The switches 40L, 40M, and 40H do not overlap, for example, any of the receive switches 50L, 50M, and 50H.

The duplexers 31L, 32L, 33M, 34M, 35H, and 36H may overlap the low-noise amplifiers 20L, 20M, and 20H.

As described above, in the radio-frequency module 1A according to this modification, the transmit switches 40L and 40M are mounted on the major surface 90a.

As such, for example, empty spaces on the major surface 90a having the filters can be efficiently used by disposing elements such as the switch 40L. This reduces unused spaces, and consequently, the radio-frequency module 1A can be miniaturized.

Further, for example, when the major surface 90a is viewed in plan view, the transmit switches 40L and 40M do not overlap both the low-noise amplifiers 20L and 20M.

This increases the distance between the transmit switches 40L and 40M and the low-noise amplifiers 20L and 20M for receive signals, and thus, it is possible to reduce the likelihood of magnetic-field coupling between the transmit switches 40L and 40M and the low-noise amplifiers 20L and 20M for receive signals. As such, the isolation between transmit and receive sides is provided, and the degradation of receiving accuracy can be suppressed.

5-2. Second Modification

Next, a second modification will be described.

The second modification differs from the embodiment in the position of circuit elements on the module substrate. Specifically, in a radio-frequency module according to the second modification, the circuit elements included in the radio-frequency module are mounted on one surface of the module substrate. The circuit configuration of the radio-frequency module according to this modification is identical to the circuit configuration illustrated in FIG. 1.

Figure 5:
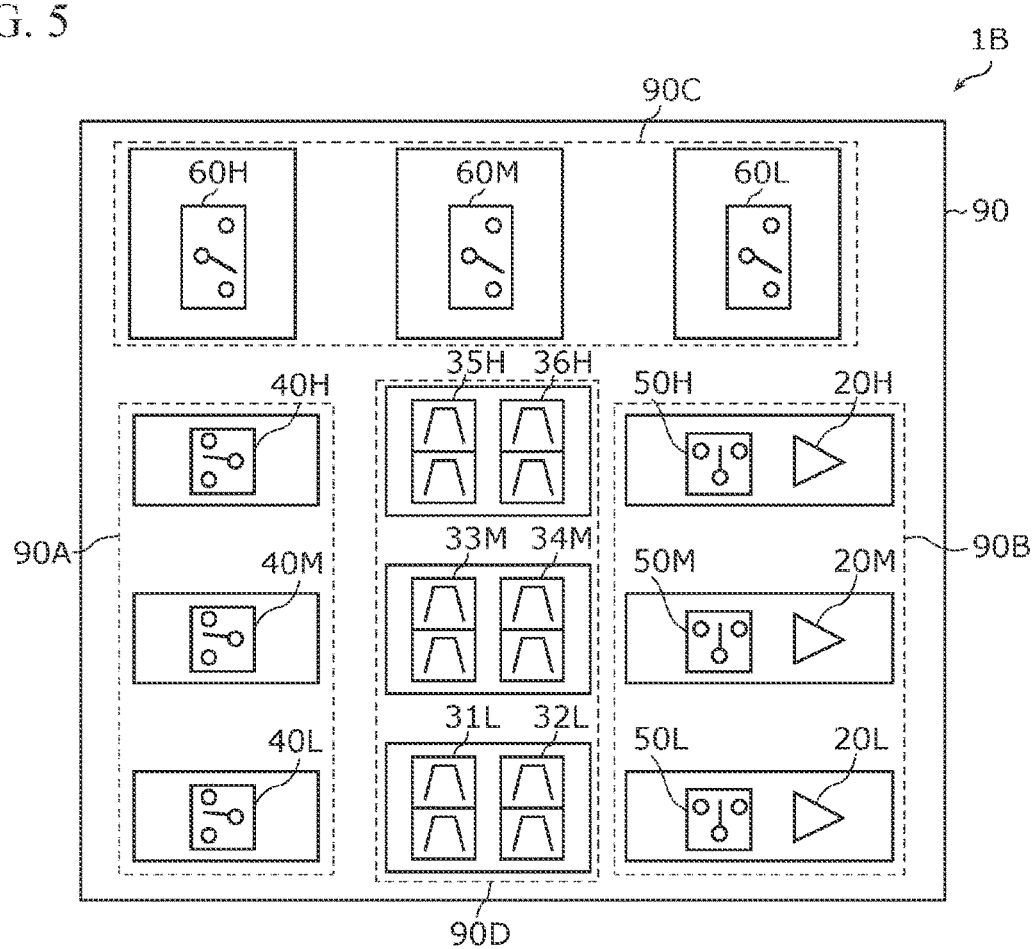
FIG. 5 is a plan view schematically illustrating a structure of a radio-frequency module according to a second modification of the embodiment.

FIG. 5 is a plan view schematically illustrating a structure of a radio-frequency module 1B according to the second modification of the present embodiment. FIG. 5 schematically illustrates an arrangement of circuit elements when a mounting surface of the radio-frequency module 1B is viewed in plan view.

As illustrated in FIG. 5, the low-noise amplifiers 20L, 20M, and 20H, the duplexers 31L, 32L, 33M, 34M, 35H, and 36H, the switches 40L, 40M, and 40H, the switches 50L, 50M, and 50H, and the switches 60L, 60M, and 60H are mounted on one surface of a module substrate. The mounting surface for the circuit elements may be, for example, the major surface 90a of the module substrate 90, but may be the major surface 90b.

In the example illustrated in FIG. 5, the circuit elements are grouped under individual functions, and circuit elements of the same function are disposed together. The mounting surface of the module substrate 90 is divided into a transmit-switch section 90A, a LNA section 90B, an antenna-switch section 90C, and a filter section 90D.

The transmit-switch section 90A is an example of the first section for arranging the first transmit switch, the second transmit switch, and the third transmit switch. Similarly to the transmit-switch section 81a according to the fourth practical example, the switches 40L, 40M, and 40H are disposed in the transmit-switch section 90A.

The LNA section 90B is an example of the second section for arranging the first low-noise amplifier, the second low-noise amplifier, and the third low-noise amplifier. In the LNA section 90B, the first receive switch, the second receive switch, and the third receive switch are also disposed. Similarly to the LNA section 81b according to the fourth practical example, the low-noise amplifiers 20L, 20M, and 20H and the switches 50L, 50M, and 50H are disposed in the LNA section 90B.

The antenna-switch section 90C is an example of the third section for arranging the first antenna switch, the second antenna switch, and the third antenna switch. Similarly to the antenna-switch section 81c according to the fourth practical example, the switches 60L, 60M, and 60H are disposed in the antenna-switch section 90C.

The filter section 90D is an example of a fourth section for disposing the first filters, the second filters, and the third filters. In the filter section 90D, the duplexers 31L, 32L, 33M, 34M, 35H, and 36H are disposed.

The filter section 90D is positioned between the transmit-switch section 90A and the LNA section 90B in the example illustrated in FIG. 5, but the position is not limited to this example. For example, the antenna-switch section 90C may be positioned between the transmit-switch section 90A and the LNA section 90B. Alternatively, the transmit-switch section 90A, the LNA section 90B, the antenna-switch section 90C, and the filter section 90D may be arranged in a circle. For example, the mounting surface of the module substrate 90 may be divided by a cross on the center into four sections including the vertices, and the four sections may individually correspond to the transmit-switch section 90A, the LNA section 90B, the antenna-switch section 90C, and the filter section 90D.

Also in this modification, the switch 40L for processing transmit signals in the low-band circuit 1L is disposed apart from the low-noise amplifier 20M and the switch 50M of the middle-band circuit 1M and the low-noise amplifier 20H and the switch 50H of the high-band circuit 1H. With this structure, it is possible to provide isolation between the switch 40L, and the low-noise amplifier 20M and the switch 50M in the radio-frequency module 1B. Consequently, it is possible to reduce effects of transmit signals in the low-band group on receive signals in the middle-band group and receive signals in the high-band group and thus suppress the degradation of receiving accuracy.

In this modification, all the circuit elements mounted on one surface of the module substrate may be included in one IC device. Alternatively, the circuit elements may be independently included in different electronic components.

As described above, the radio-frequency module 1B according to this modification further includes the module substrate 90 having the major surface 90a and the major surface 90b opposite to the major surface 90a. The duplexers 31L and 32L, the switch 60L, the transmit switch 40L, the duplexers 33M and 34M, the switch 60M, and the transmit switch 40M are mounted on the major surface 90*b*.

As such, the circuit elements can be mounted together on one surface of the module substrate 90, and as a result, the radio-frequency module 1B can be made with low profile.

5-3. Third Modification and Fourth Modification

Next, a third modification and a fourth modification will be described.

The third and fourth modifications differ from the embodiment in the number of antenna connection terminals included in the radio-frequency module. In a radio-frequency module according to the third modification, the first communication circuit and the second communication circuit are coupled to a common antenna connection terminal. In a radio-frequency module according to the fourth modification, the first communication circuit, the second communication circuit, and the third communication circuit are coupled to a common antenna connection terminal.

Figure 6A:
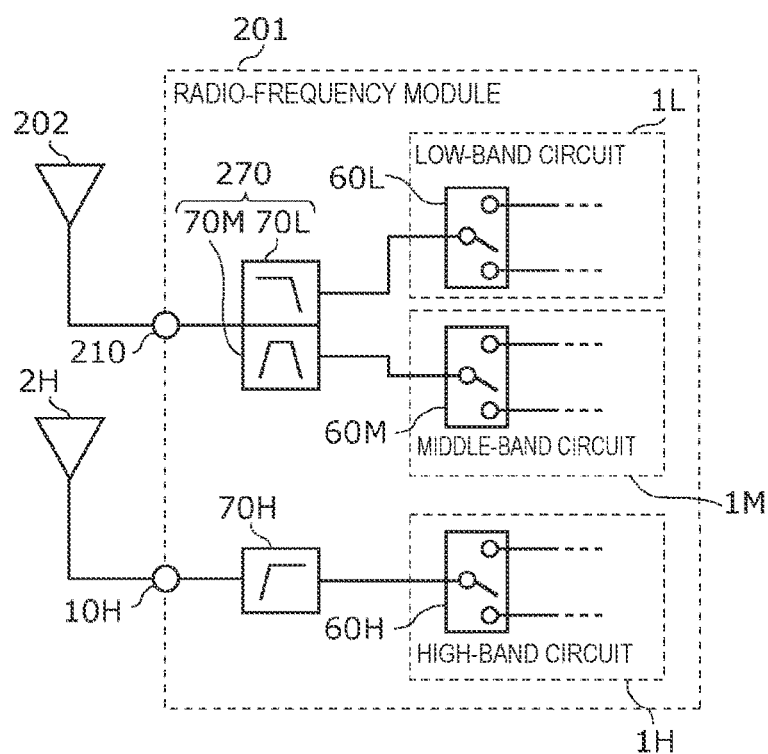
FIG. 6A is a circuit diagram illustrating a main part of a radio-frequency module according to a third modification of the embodiment.

FIG. 6A is a circuit diagram illustrating a main part of a radio-frequency module 201 according to the third modification of the present embodiment. Specifically, FIG. 6A illustrates a circuit configuration of a portion close to antenna connection terminals in the radio-frequency module 201. FIG. 6A does not illustrate detailed configuration of the low-band circuit 1L, the middle-band circuit 1M, and the high-band circuit 1H, the transmit-signal input terminals 11L, 11M, and 11H, the receive-signal output terminals 12L, 12M, and 12H, and the control circuit 70.

As illustrated in FIG. 6A, the radio-frequency module 201 includes an antenna connection terminal 210 and the antenna connection terminal 10H. The radio-frequency module 201 includes a duplexer 270 and a filter 70H.

The antenna connection terminal 210 is an example of one antenna connection terminal coupled to the first antenna switch of the first communication circuit and the second antenna switch of the second communication circuit. Specifically, the switch 60L of the low-band circuit 1L and the switch 60M of the middle-band circuit 1M are coupled to the antenna connection terminal 210 via the duplexer 270. This means that the antenna connection terminal 210 is a common antenna connection terminal shared by the low-band circuit 1L and the middle-band circuit 1M.

An antenna 202 is coupled to the antenna connection terminal 210. The antenna 202 emits a transmit signal outputted from the low-band circuit 1L and a transmit signal outputted from the middle-band circuit 1M. The antenna 202 receives a receive signal from outside and outputs the receive signal to the low-band circuit 1L or the middle-band circuit 1M. The receive signal received by the antenna 202 is outputted by the duplexer 270 to the low-band circuit 1L or the middle-band circuit 1M.

The duplexer 270 is disposed between the antenna connection terminal 210, and the low-band circuit 1L and the middle-band circuit 1M. As illustrated in FIG. 6A, the duplexer 270 includes a filter 70L and a filter 70M.

The filter 70L passes transmit signals and receive signals in the low-band group. The filter 70L is disposed between the antenna connection terminal 210 and the common terminal of the antenna switch 60L of the low-band circuit 1L.

The filter 70M passes transmit signals and receive signals in the middle-band group. The filter 70M is disposed between the antenna connection terminal 210 and the common terminal of the antenna switch 60M of the middle-band circuit 1M.

The antenna connection terminal 210 may be shared by the low-band circuit 1L and the high-band circuit 1H. Alternatively, the antenna connection terminal 210 may be shared by the middle-band circuit 1M and the high-band circuit 1H.

The radio-frequency module 201 may include a common antenna connection terminal shared by the low-band circuit 1L, the middle-band circuit 1M, and the high-band circuit 1H. This means that the radio-frequency module 201 may include a common antenna connection terminal shared by three communication circuits.

Figure 6B:
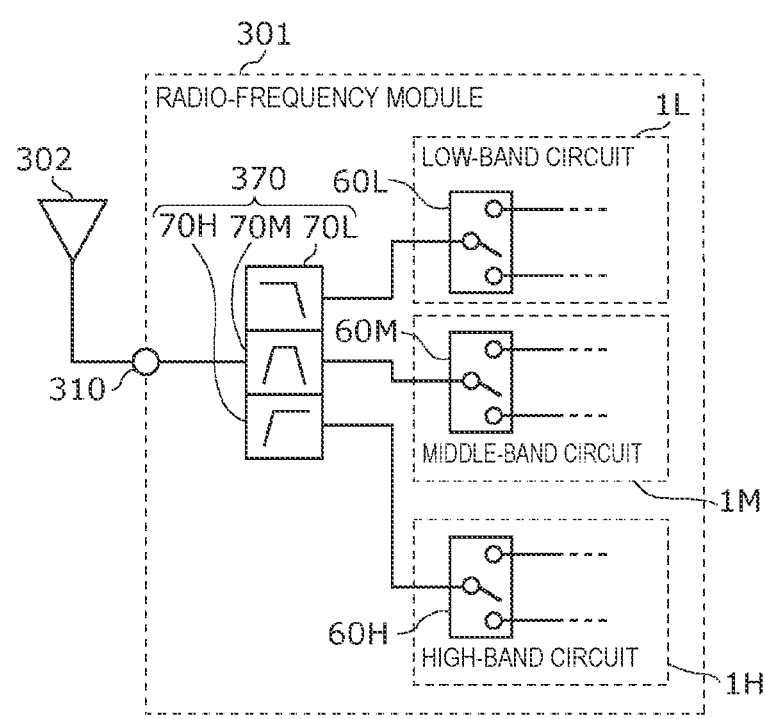
FIG. 6B is a circuit diagram illustrating a main part of a radio-frequency module according to a fourth modification of the embodiment.

FIG. 6B is a circuit diagram illustrating a main part of a radio-frequency module 301 according to the fourth modification of the present embodiment. As illustrated in FIG. 6B, the radio-frequency module 301 includes an antenna connection terminal 310 and a triplexer 370.

The antenna connection terminal 310 is an example of the one antenna connection terminal coupled to the first antenna switch of the first communication circuit, the second antenna switch of the second communication circuit, and the third antenna switch of the third communication circuit. Specifically, the switch 60L of the low-band circuit 1L, the switch 60M of the middle-band circuit 1M, and the switch 60H of the high-band circuit 1H are coupled to the antenna connection terminal 310 via the triplexer 370. This means that the antenna connection terminal 310 is a common antenna connection terminal shared by the low-band circuit 1L, the middle-band circuit 1M, and the high-band circuit 1H.

An antenna 302 is coupled to the antenna connection terminal 310. The antenna 302 emits a transmit signal outputted from the low-band circuit 1L, a transmit signal outputted from the middle-band circuit 1M, and a transmit signal outputted from the high-band circuit 1H. The antenna 302 receives a receive signal from outside and outputs the receive signal to the low-band circuit 1L, the middle-band circuit 1M, or the high-band circuit 1H. The receive signal received by the antenna 302 is outputted by the triplexer 370 to the low-band circuit 1L, the middle-band circuit 1M, or the high-band circuit 1H.

The triplexer 370 is disposed between the antenna connection terminal 310, and the low-band circuit 1L, the middle-band circuit 1M, and the high-band circuit 1H. As illustrated in FIG. 6B, the triplexer 370 includes the filters 70L, 70M, and 70H. The filters 70L and 70M are the same as in the third modification.

The filter 70H passes transmit signals and receive signals in the high-band group. The filter 70H is disposed between the antenna connection terminal 310 and the common terminal of the antenna switch 60H of the high-band circuit 1H.

As described above, in the radio-frequency module 201 or 301 according to these modifications, the one or more antenna connection terminals is the one antenna connection terminal 210 or 310. The radio-frequency module 201 or 301 further includes the duplexer 270 or the triplexer 370 disposed between the one antenna connection terminal 210 or 310, and the low-band circuit 1L and the middle-band circuit 1M.

This configuration reduces antenna connection terminals, and thus, the radio-frequency module 201 or 301 can be further miniaturized. Moreover, it is possible to reduce antennas, the communication device 6 can be further miniaturized.

(Others)

The radio-frequency module and communication device according to the present disclosure have been described above by using the embodiment and its modifications, but the present disclosure is not limited to the embodiment.

For example, the embodiment describes the example in which the first band group, the second band group, and the third band group are respectively the low-band group, the middle-band group, and the high-band group, but this should not be construed in a limiting sense.

For example, the first band group may be the middle-band group or the low-band group; the second band group may be the high-band group; and the third band group may be a band group having a frequency range higher than the frequency range of the high-band group. Alternatively, the first band group may be the high-band group; and the second band group and the third band group may be individual band groups having frequency ranges higher than the frequency range of the high-band group.

Alternatively, the second band group may be the low-band group; the third band group may be the middle-band group or the high-band group; the first band group may be a band group having a frequency range lower than the frequency range of the low-band group. Alternatively, the third band group may be the low-band group; and the first band group and the second band group may be individual band groups having frequency ranges lower than the frequency range of the low-band group.

For example, the radio-frequency module processes radio-frequency signals in only the first band group and the second band group and does not necessarily process radio-frequency signals in the third band group. Specifically, the radio-frequency module may process radio-frequency signals in only the low-band group and the middle-band group. In this case, the radio-frequency module 1 illustrated in FIG. 1 does not necessarily include the high-band circuit 1H, the antenna connection terminal 10H, the transmit-signal input terminal 11H, and the receive-signal output terminal 12H. The communication device 6 does not necessarily include the antenna 2H and the power amplifier 5H.

Alternatively, the radio-frequency module may process radio-frequency signals in only the low-band group and the high-band group. In this case, the radio-frequency module 1 illustrated in FIG. 1 does not necessarily include the middle-band circuit 1M, the antenna connection terminal 10M, the transmit-signal input terminal 11M, and the receive-signal output terminal 12M. The communication device 6 does not necessarily include the antenna 2M and the power amplifier 5M. In this case, the high-band group is an example of the second band group, and the high-band circuit 1H and the transmit-signal input terminal 11H are respectively an example of the second communication circuit and an example of the second external connection terminal. The power amplifier 5H is an example of the second amplifier.

Alternatively, the radio-frequency module may process radio-frequency signals in only the middle-band group and the high-band group. In this case, the radio-frequency module 1 illustrated in FIG. 1 does not necessarily include the low-band circuit 1L, the antenna connection terminal 10L, the transmit-signal input terminal 11L, and the receive-signal output terminal 12L. The communication device 6 does not necessarily include the antenna 2L and the power amplifier 5L. In this case, the middle-band group and the high-band group are respectively an example of the first band group and an example of the second band group. The middle-band circuit 1M and the transmit-signal input terminal 11M are respectively an example of the first communication circuit and an example of the first external connection terminal. The power amplifier 5M is an example of the first amplifier. The high-band circuit 1H and the transmit-signal input terminal 11H are respectively an example of the second communication circuit and an example of the second external connection terminal. The power amplifier 5H is an example of the second amplifier.

Alternatively, the radio-frequency module may process radio-frequency signals in a band group having a frequency range lower than the frequency range of the low-band group or higher than the frequency range of the high-band group. The radio-frequency module can include a communication circuit for transferring transmit signals and receive signals in the targeted band group. The communication circuit has a configuration similar to, for example, the low-band circuit 1L.

Furthermore, for example, the radio-frequency module does not necessarily include the low-noise amplifier. Specifically, the low-noise amplifiers 20L, 20M, and 20H may be formed in a module different from the radio-frequency module. In this case, the receive-signal output terminals 12L, 12M, and 12H of the radio-frequency module may be positioned between the common terminals of the switches 50L, 50M, and 50H and the input terminals of the low-noise amplifiers 20L, 20M, and 20H.

Moreover, for example, the radio-frequency module does not necessarily include the switches 50L, 50M, and 50H. In this case, the radio-frequency module may include six receive-signal output terminals positioned between the receive filters 31R to 36R of the duplexers and the selection terminals of the switches 50L, 50M, and 50H.

Further, for example, the switches included in the radio-frequency module are described as discrete switch elements in the embodiment, but this should not be construed in a limiting sense. For example, the switches 60L, 60M, and 60H may be implemented by one switch IC formed by integrating the switches 60L, 60M, and 60H. The switch IC is a multi-connection switching circuit that can simultaneously connect one or more of the low-band circuit 1L, the middle-band circuit 1M, and the high-band circuit 1H to the one or more antenna connection terminals.

Furthermore, for example, the embodiment describes the example in which the first filters, the second filters, and the third filters are all duplexers, but this should not be construed in a limiting sense. The radio-frequency module 1 may include a filter for both transmit and receive signals and a switch for switching transmit and receive signals instead of each of the duplexers 31L, 32L, 33M, 34M, 35H, and 36H. This means that the radio-frequency module 1 may have a configuration for a time division duplexing system. Also in this case, the radio-frequency module can simultaneously transmit and receive signals in different communication bands in the same band group. For example, the low-band circuit 1L can simultaneously transfer a transmit signal in the communication band A of the low-band group and a receive signal in the communication band B of the low-band group.

Moreover, for example, in the radio-frequency modules and communication devices according to the practical examples and modifications described above, another circuit element, wiring, and the like may be inserted in paths connecting any of the circuit components and signal paths that are illustrated in the drawings.

In addition, all forms obtained by making to the embodiment and modifications various changes that occur to those skilled in the art and all forms implemented as any combination of components and functions according to the embodiment and modifications without necessarily departing from the scope of the present disclosure are embraced within the present disclosure.

INDUSTRIAL APPLICABILITY

The present disclosure can be used as a multiband radio-frequency module provided at the front-end for a wide variety of communication devices such as mobile phones.

REFERENCE SIGNS LIST 1, 1A, 1B, 201, 301 radio-frequency module
1H high-band circuit
1L low-band circuit
1M middle-band circuit
2H, 2L, 2M, 202, 302 antenna
3 RF signal processing circuit (RFIC)
4 baseband signal processing circuit (BBIC)
5H, 5L, 5M power amplifier
6 communication device
10H, 10L, 10M, 210, 310 antenna connection terminal
11H, 11L, 11M transmit-signal input terminal
12H, 12L, 12M receive-signal output terminal
20H, 20L, 20M low-noise amplifier
31L, 32L, 33M, 34M, 35H, 36H, 270 duplexer
31R, 32R, 33R, 34R, 35R, 36R receive filter
31T, 32T, 33T, 34T, 35T, 36T transmit filter
40H, 40L, 40M, 50H, 50L, 50M, 60H, 60L, 60M switch
70 control circuit
70H, 70L, 70M filter
80a, 80b, 80c filter device
81, 81A, 81B, 81C, 81D, 83a, 83b IC device
81a, 90A transmit-switch section
81b, 90B LNA section
81c, 90C antenna-switch section
81H high-band section
81L low-band section
81M middle-band section
82 switch IC
90 module substrate
90a, 90b major surface
90D filter section
91, 92 resin member
93a, 93b conductive member
370 triplexer

The invention claimed is:

1. A radio-frequency module comprising:
a first communication circuit configured to transfer a first transmit-signal group and a first receive-signal group, the first transmit-signal group and the first receive-signal group being in a first band group, the first band group comprising a plurality of first communication bands, and the plurality of first communication bands comprising different frequency bands;
a second communication circuit configured to transfer a second transmit-signal group and a second receive-signal group, the second transmit-signal group and the second receive-signal group being in a second band group, the second band group comprising a plurality of second communication bands, and the plurality of second communication bands comprising different frequency bands that are higher than the frequency bands of the plurality of first communication bands;
one or more antenna connection terminals;
a first external connection terminal coupled to an output terminal of a first amplifier, the first amplifier being configured to amplify the first transmit-signal group; and
a second external connection terminal coupled to an output terminal of a second amplifier, the second amplifier being configured to amplify the second transmit-signal group,
wherein the first communication circuit comprises:
a plurality of first filters having pass bands individually corresponding to the plurality of first communication bands,
a first antenna switch configured to selectively connect one of the one or more antenna connection terminals to the individual first filters, and
a first transmit switch configured to selectively connect the first external connection terminal to the individual first filters, and
wherein the second communication circuit comprises:
a plurality of second filters having pass bands individually corresponding to the plurality of second communication bands,
a second antenna switch configured to selectively connect the one or more antenna connection terminals to the individual second filters, and
a second transmit switch configured to selectively connect the second external connection terminal to the individual second filters.

2. The radio-frequency module according to claim 1, wherein at least one of the frequency bands of the plurality of second communication bands comprises an nth harmonic frequency of a frequency in at least one of the plurality of first communication bands, where n is a natural number equal to or greater than 2.

3. The radio-frequency module according to claim 1, wherein:
the first communication circuit further comprises a first low-noise amplifier configured to amplify the first receive-signal group, and
the second communication circuit further comprises a second low-noise amplifier configured to amplify the second receive-signal group.

4. The radio-frequency module according to claim 3, wherein:
the first communication circuit further comprises a first receive switch configured to selectively connect the individual first filters to the first low-noise amplifier, and
the second communication circuit further comprises a second receive switch configured to selectively connect the individual second filters to the second low-noise amplifier.

5. The radio-frequency module according to claim 4, wherein the first transmit switch comprises:
a common terminal coupled to the first external connection terminal, and
a plurality of selection terminals corresponding to the plurality of first filters in one-to-one correspondence, the plurality of selection terminals being coupled to the corresponding first filters,
wherein the first antenna switch comprises:
a common terminal coupled to one of the one or more antenna connection terminals, and
a plurality of selection terminals corresponding to the plurality of first filters in one-to-one correspondence, the plurality of selection terminals being coupled to the corresponding first filters,
wherein the first receive switch comprises:
a common terminal coupled to an input terminal of the first low-noise amplifier, and a plurality of selection terminals corresponding to the plurality of first filters in one-to-one correspondence, the plurality of selection terminals being coupled to the corresponding first filters, wherein the second transmit switch comprises:
   a common terminal coupled to the second external connection terminal, and
   a plurality of selection terminals corresponding to the plurality of second filters in one-to-one correspondence, the plurality of selection terminals being coupled to the corresponding second filters, wherein the second antenna switch comprises:
   a common terminal coupled to one of the one or more antenna connection terminals, and
   a plurality of selection terminals corresponding to the plurality of second filters in one-to-one correspondence, the plurality of selection terminals being coupled to the corresponding second filters, and wherein the second receive switch comprises:
   a common terminal coupled to an input terminal of the second low-noise amplifier, and
   a plurality of selection terminals corresponding to the plurality of second filters in one-to-one correspondence, the plurality of selection terminals being coupled to the corresponding second filters.

6. The radio-frequency module according to claim 3, further comprising:
a substrate having a first major surface and a second major surface opposite to the first major surface, wherein:
the plurality of first filters or the plurality of second filters is mounted on the first major surface, and
the first low-noise amplifier and the second low-noise amplifier are mounted on the second major surface.

7. The radio-frequency module according to claim 6, wherein the first transmit switch and the second transmit switch are mounted on the first major surface.

8. The radio-frequency module according to claim 7, wherein when the first major surface is viewed in plan view, the first transmit switch and the second transmit switch do not overlap the first low-noise amplifier or the second low-noise amplifier.

9. The radio-frequency module according to claim 6, wherein the first transmit switch and the second transmit switch are mounted on the second major surface.

10. The radio-frequency module according to claim 9, wherein the first low-noise amplifier, the second low-noise amplifier, the first transmit switch, and the second transmit switch are in one semiconductor integrated circuit (IC).

11. The radio-frequency module according to claim 10, wherein:
when one surface of the semiconductor IC is viewed in plan view, the one surface is divided into at least a first section, a second section, and a third section,
the first transmit switch and the second transmit switch are disposed in the first section,
the first low-noise amplifier and the second low-noise amplifier are disposed in the second section,
the first antenna switch and the second antenna switch are disposed in the third section, and
a power-supply wire or ground wire is disposed between the first section and the second section.

12. The radio-frequency module according to claim 10, wherein:
when one surface of the semiconductor IC is viewed in plan view, the one surface is divided into at least a first section and a second section,
the first transmit switch, the first low-noise amplifier, and the first antenna switch are disposed in the first section,
the second transmit switch, the second low-noise amplifier, and the second antenna switch are disposed in the second section, and
a power-supply wire or ground wire is disposed between the first section and the second section.

13. The radio-frequency module according to claim 10, wherein a distance between the first transmit switch and the second low-noise amplifier is longer than a distance between the first transmit switch and the first low-noise amplifier.

14. The radio-frequency module according to claim 1, further comprising:
a substrate having a first major surface and a second major surface opposite to the first major surface,
wherein the plurality of first filters, the first antenna switch, the first transmit switch, the plurality of second filters, the second antenna switch, and the second transmit switch are mounted on the second major surface.

15. The radio-frequency module according to claim 1, wherein the plurality of first filters and the plurality of second filters are all duplexers.

16. The radio-frequency module according to claim 1, wherein:
the one or more antenna connection terminals is one antenna connection terminal, and
the radio-frequency module further comprises a duplexer disposed between the one antenna connection terminal, and the first communication circuit and the second communication circuit.

17. The radio-frequency module according to claim 1, further comprising:
a third communication circuit configured to transfer a third transmit-signal group and a third receive-signal group, the third transmit-signal group and the third receive-signal being in a third band group, the third band group comprising a plurality of third communication bands, and the third communication bands comprising different frequency bands that are higher than the frequency bands of the plurality of second communication bands; and
a third external connection terminal coupled to an output terminal of a third amplifier, the third amplifier being configured to amplify the third transmit-signal group,
the third communication circuit comprising:
   a plurality of third filters having pass bands individually corresponding to the plurality of third communication bands,
   a third antenna switch configured to selectively connect the one or more antenna connection terminals to the individual third filters, and
   a third transmit switch configured to selectively connect the third external connection terminal to the individual third filters.

18. The radio-frequency module according to claim 17, wherein the third communication circuit further comprises:
a third low-noise amplifier configured to amplify the third receive-signal group, and
a third receive switch configured to selectively connect the individual third filters to the third low-noise amplifier,
wherein the third transmit switch comprises:
   a common terminal coupled to the third external connection terminal, and a plurality of selection terminals corresponding to the plurality of third filters in one-to-one correspondence, the plurality of selection terminals being coupled to the corresponding third filters, wherein the third antenna switch comprises:
- a common terminal coupled to one of the one or more antenna connection terminals, and
- a plurality of selection terminals corresponding to the plurality of third filters in one-to-one correspondence, the plurality of selection terminals being coupled to the corresponding third filters, wherein the third receive switch comprises:
- a common terminal coupled to an input terminal of the third low-noise amplifier, and
- a plurality of selection terminals corresponding to the plurality of third filters in one-to-one correspondence, the plurality of selection terminals being coupled to the corresponding third filters, and wherein the plurality of third filters are all duplexers.

19. The radio-frequency module according to claim 17, wherein:
- the plurality of first communication bands are included in a frequency range of 600 to 1000 MHz,
- the plurality of second communication bands are included in a frequency range of 1.5 to 2.2 GHz, and
- the plurality of third communication bands are included in a frequency range of 2.4 to 2.8 GHz.

20. A communication device comprising:
- the radio-frequency module according to claim 1; and
- a radio-frequency (RF) signal processing circuit configured to process a radio-frequency signal received or transmitted by an antenna,
- the radio-frequency module being configured to transfer the radio-frequency signal between the antenna and the RF signal processing circuit.

* * * * *